US012728854B2

(12) United States Patent
Obara et al.

(10) Patent No.: US 12,728,854 B2
(45) Date of Patent: Sep. 8, 2026

(54) HAULING VEHICLE AND TRAFFIC CONTROL SYSTEM

(71) Applicant: Hitachi Construction Machinery Co., Ltd., Tokyo (JP)

(72) Inventors: Hiroki Obara, Chiyoda-ku (JP); Shinichi Uotsu, Tsuchiura (JP); Yuuma Honjou, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 134 days.

(21) Appl. No.: 18/856,919

(22) PCT Filed: Apr. 26, 2023

(86) PCT No.: PCT/JP2023/016518
§ 371 (c)(1),
(2) Date: Oct. 15, 2024

(87) PCT Pub. No.: WO2023/210708
PCT Pub. Date: Nov. 2, 2023

(65) Prior Publication Data

US 2026/0175840 A1 Jun. 25, 2026

(30) Foreign Application Priority Data

Apr. 28, 2022 (JP) ................................ 2022-074486

(51) Int. Cl.
*B60W 30/14* (2006.01)
*B60W 40/13* (2012.01)
(Continued)

(52) U.S. Cl.
CPC .......... *B60W 30/146* (2013.01); *B60W 40/13* (2013.01); *B60W 50/0205* (2013.01);
(Continued)

(58) Field of Classification Search
CPC ............... B60W 30/146; B60W 40/13; B60W 50/0205; B60W 60/001; B60W 2050/021;
(Continued)

(56) References Cited

U.S. PATENT DOCUMENTS

2016/0090089 A1 3/2016 Ichinose et al.
2017/0144663 A1* 5/2017 Karlsson ............... B60W 10/10
2018/0244269 A1* 8/2018 Carlsson ........... B60W 30/1884

FOREIGN PATENT DOCUMENTS

JP 2013-1474 A 1/2013
JP 2016-68726 A 5/2016
(Continued)

OTHER PUBLICATIONS

International Search Report (PCT/ISA/210) issued in PCT Application No. PCT/JP2023/016518 dated Jun. 27, 2023 with English translation (5 pages).

(Continued)

*Primary Examiner* — Aaron L Troost
(74) *Attorney, Agent, or Firm* — Crowell & Moring LLP

(57) ABSTRACT

A hauling vehicle includes a storage device that stores map information including a route gradient and a route limiting speed, and a vehicle controller that generates a target speed on the basis of the position, the orientation, and the travelling speed of a vehicle body and the map information. The vehicle controller calculates a protection limiting speed that increases according to the elapse of time starting from detection of actuation of a mechanical brake device, on the basis of the travelling speed and the route gradient. The vehicle controller calculates a first distance across which the vehicle body can travel in the case where the route limiting speed is set as the upper limit value of the target speed after the elapse of a maintenance time settled in advance, and calculates a second distance across which the vehicle body can travel in the case where the protection limiting speed is
(Continued)

set as the upper limit value of the target speed. The vehicle controller employs the lower speed from either of the protection limiting speed and the route limiting speed as the upper limit value of the target speed when the first distance is shorter than the second distance, and outputs a maintenance request instruction when the first distance is longer than the second distance.

9 Claims, 16 Drawing Sheets

(51) Int. Cl.
*B60W 50/02* (2012.01)
*B60W 60/00* (2020.01)

(52) U.S. Cl.
CPC ..... *B60W 60/001* (2020.02); *B60W 2050/021* (2013.01); *B60W 2300/125* (2013.01); *B60W 2520/10* (2013.01); *B60W 2552/15* (2020.02); *B60W 2552/40* (2020.02); *B60W 2555/20* (2020.02); *B60W 2555/60* (2020.02); *B60W 2556/40* (2020.02); *B60W 2556/50* (2020.02)

(58) Field of Classification Search
CPC ....... B60W 2300/125; B60W 2520/10; B60W 2552/15; B60W 2552/40; B60W 2555/20; B60W 2555/60; B60W 2556/40; B60W 2556/50
See application file for complete search history.

(56) References Cited

FOREIGN PATENT DOCUMENTS

| | | |
|---|---|---|
| JP | 2017-178495 A | 10/2017 |
| JP | 2017-199094 A | 11/2017 |

OTHER PUBLICATIONS

Japanese-language Written Opinion (PCT/ISA/237) issued in PCT Application No. PCT/JP2023/016518 dated Jun. 27, 2023 with English translation (6 pages).
International Preliminary Report on Patentability (PCT/IB/338 & PCT/IB/373) issued in PCT Application No. PCT/JP2023/016518 dated Nov. 7, 2024, including English translation of document CZ Japanese-language Written Opinion (PCT/ISA/237), filed on Oct. 15, 2024) (5 pages).

* cited by examiner

[FIG. 1]
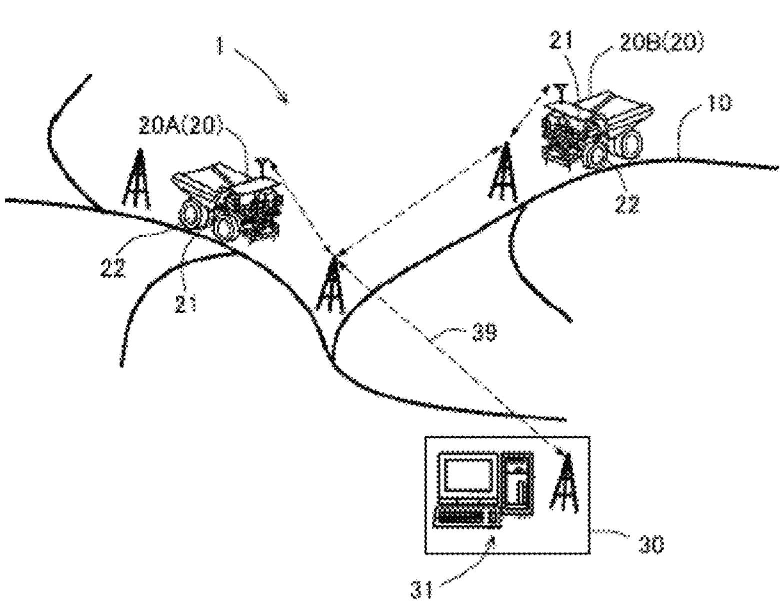

[FIG. 2]
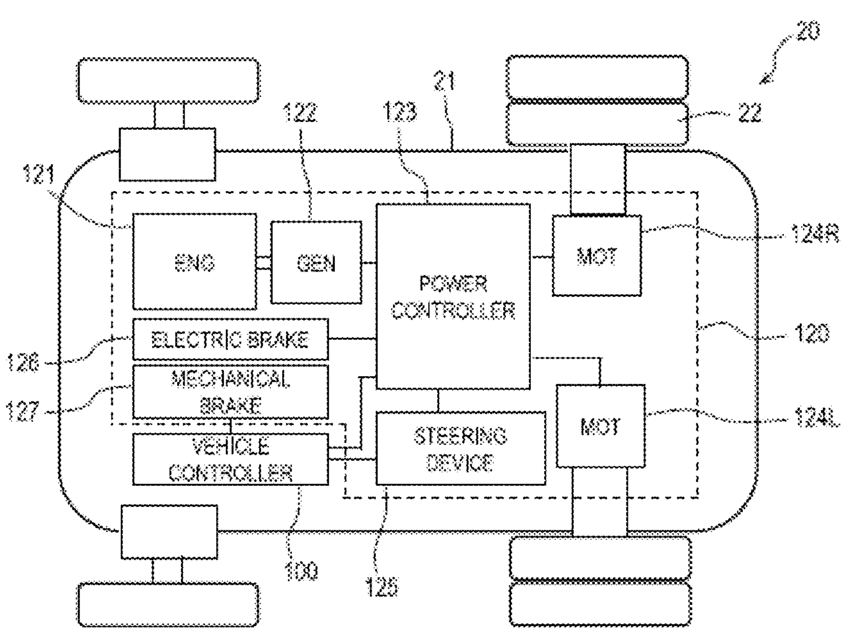

[FIG. 3]
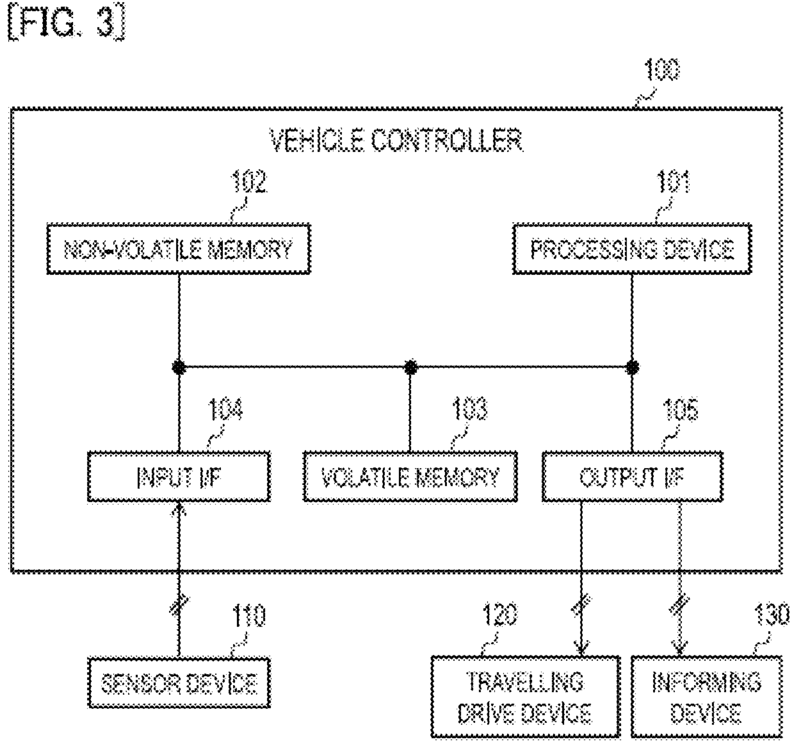

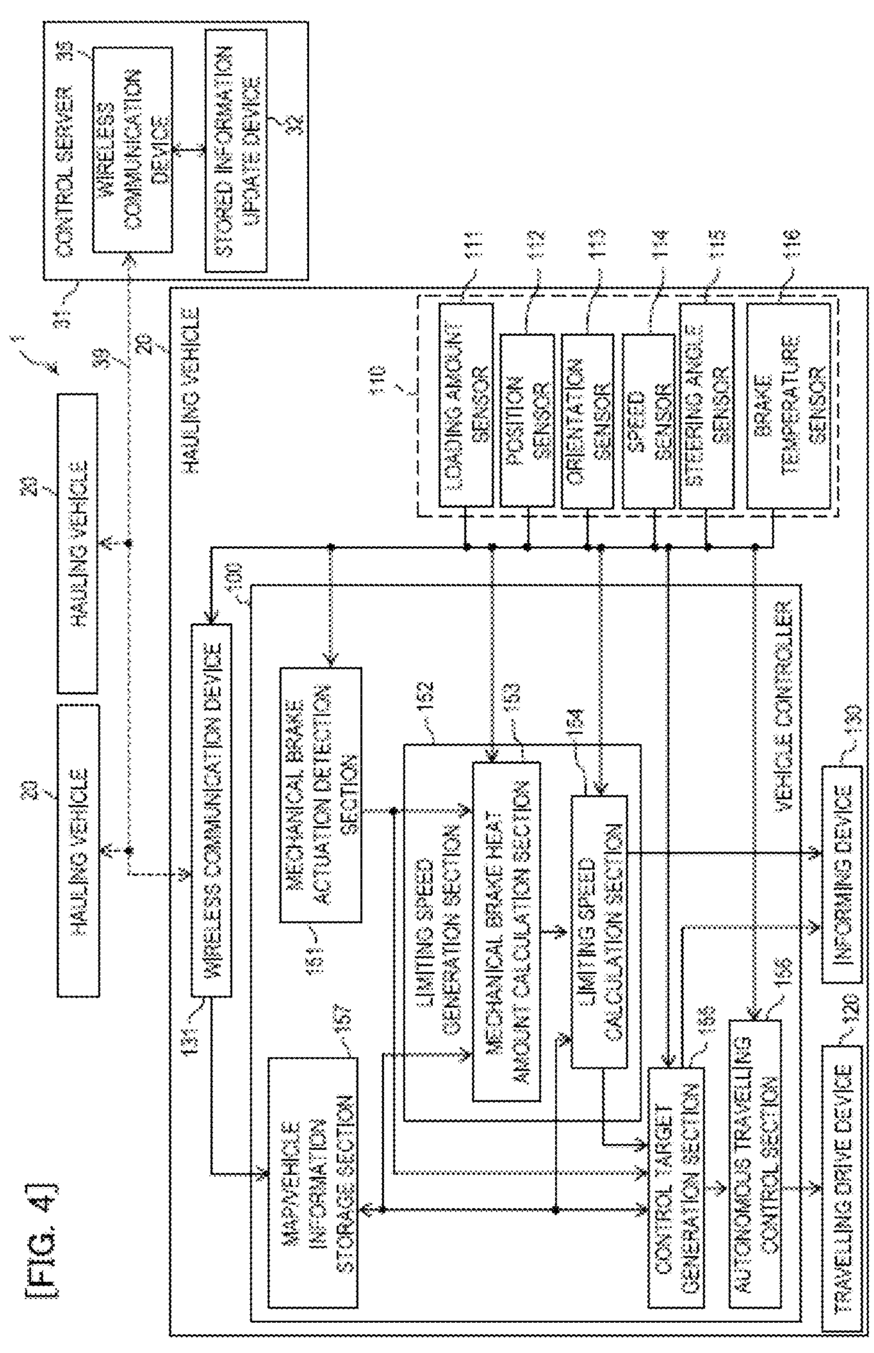
[FIG. 4]

MAP INFORMATION

| NODE ID | NODE COORDINATES (X, Y) | ROUTE LIMITING SPEED $Va$ | ROUTE GRADIENT $\theta$ | ROAD SURFACE RESISTANCE $Fr$ |
|---|---|---|---|---|
| 1 | $(X_1, Y_1)$ | $Va_1$ | $\theta_1$ | $Fr_1$ |
| 2 | $(X_2, Y_2)$ | $Va_2$ | $\theta_2$ | $Fr_2$ |
| 3 | $(X_3, Y_3)$ | $Va_3$ | $\theta_3$ | $Fr_3$ |
| ... | ... | ... | ... | ... |
| n | $(X_n, Y_n)$ | $Va_n$ | $\theta_n$ | $Fr_n$ |
| ... | ... | ... | ... | ... |

[FIG. 7]

VEHICLE INFORMATION

| ACCUMULATED HEAT AMOUNT CALCULATION CLOCK TIME | MECHANICAL BRAKE ACCUMULATED HEAT AMOUNT | CUMULATIVE MECHANICAL BRAKE ACCUMULATED HEAT AMOUNT |
|---|---|---|
| $T$ | $Q$ | $U$ |

[FIG. 8]
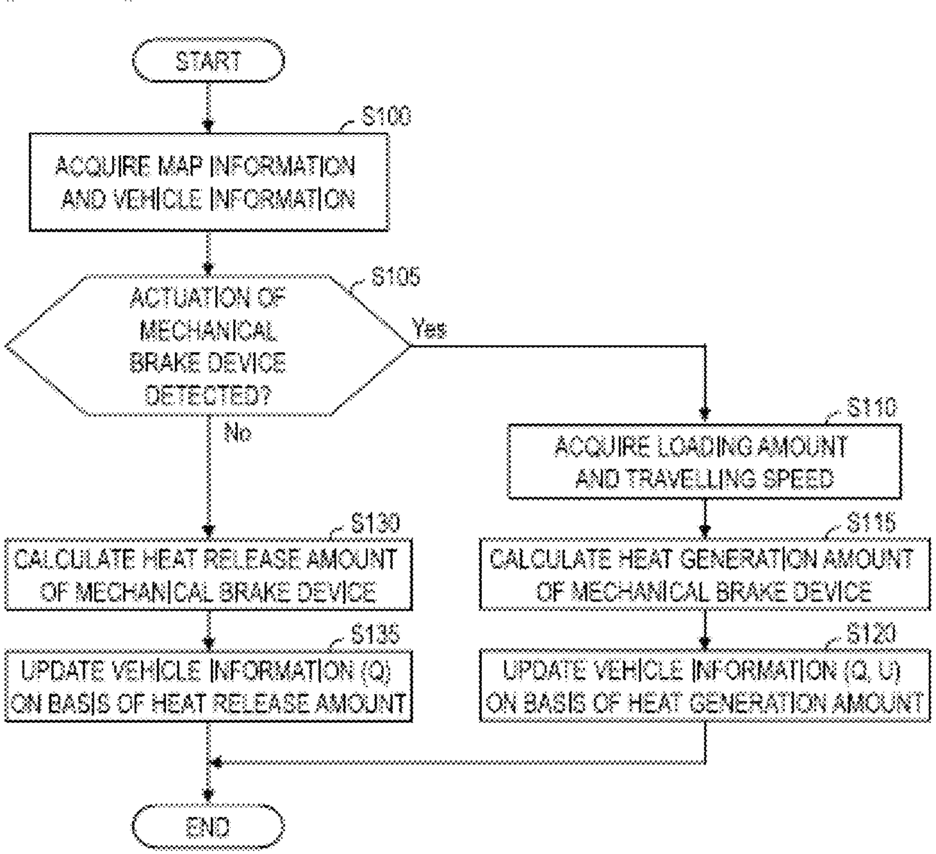

[FIG. 9A]
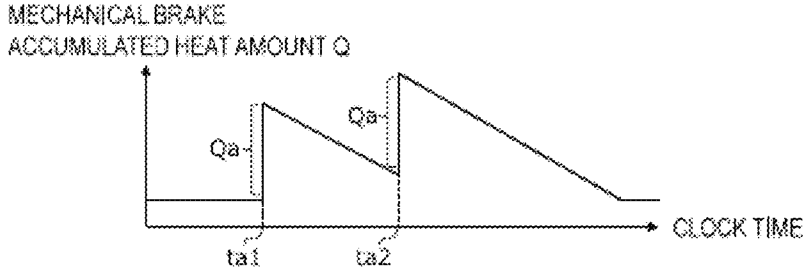
[FIG. 9B]
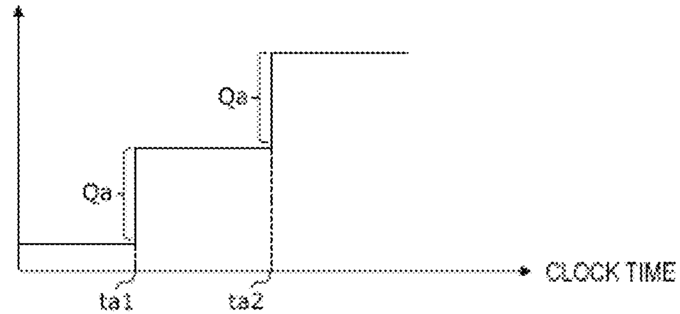

[FIG. 10]
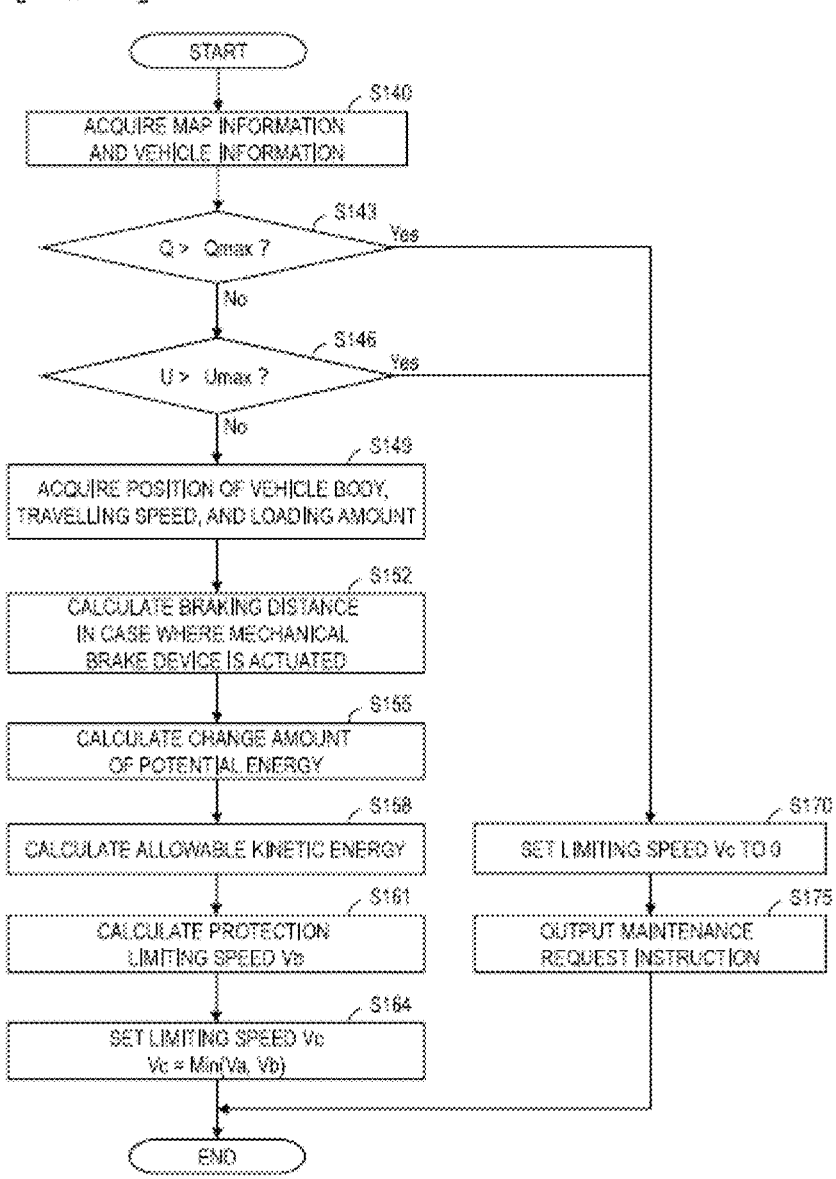

[FIG. 11]
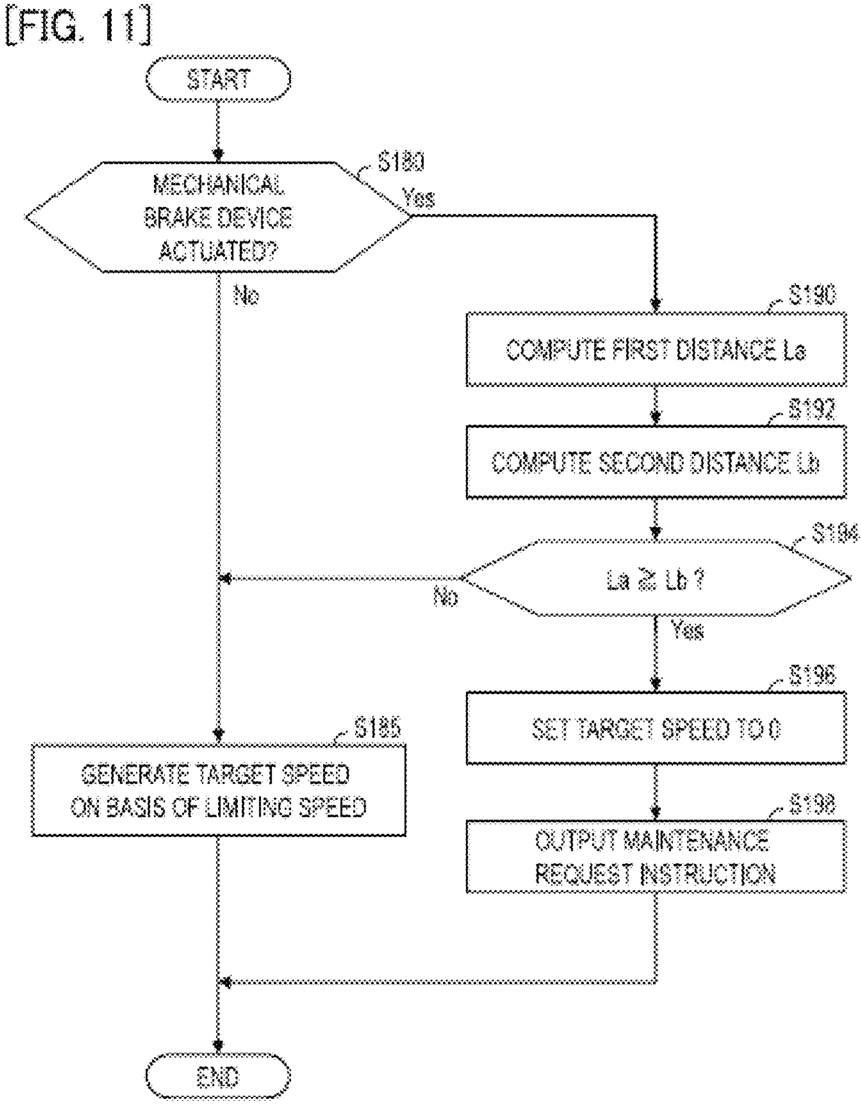

[FIG. 12]
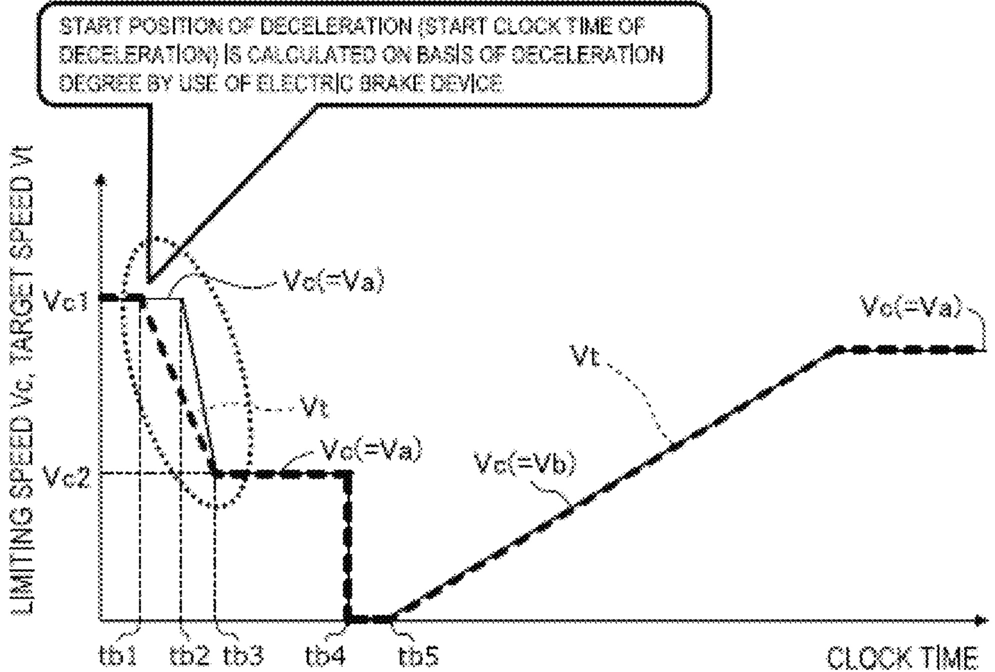

[FIG. 13]
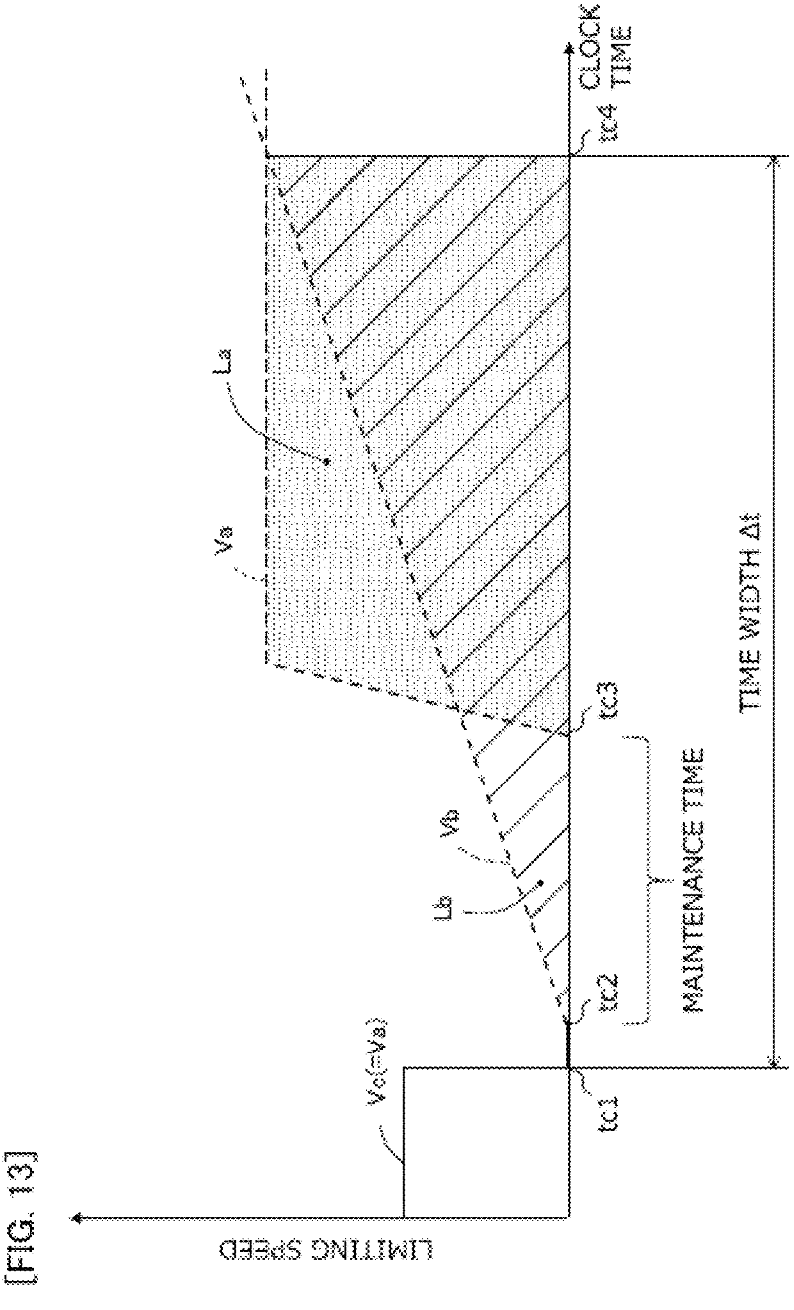

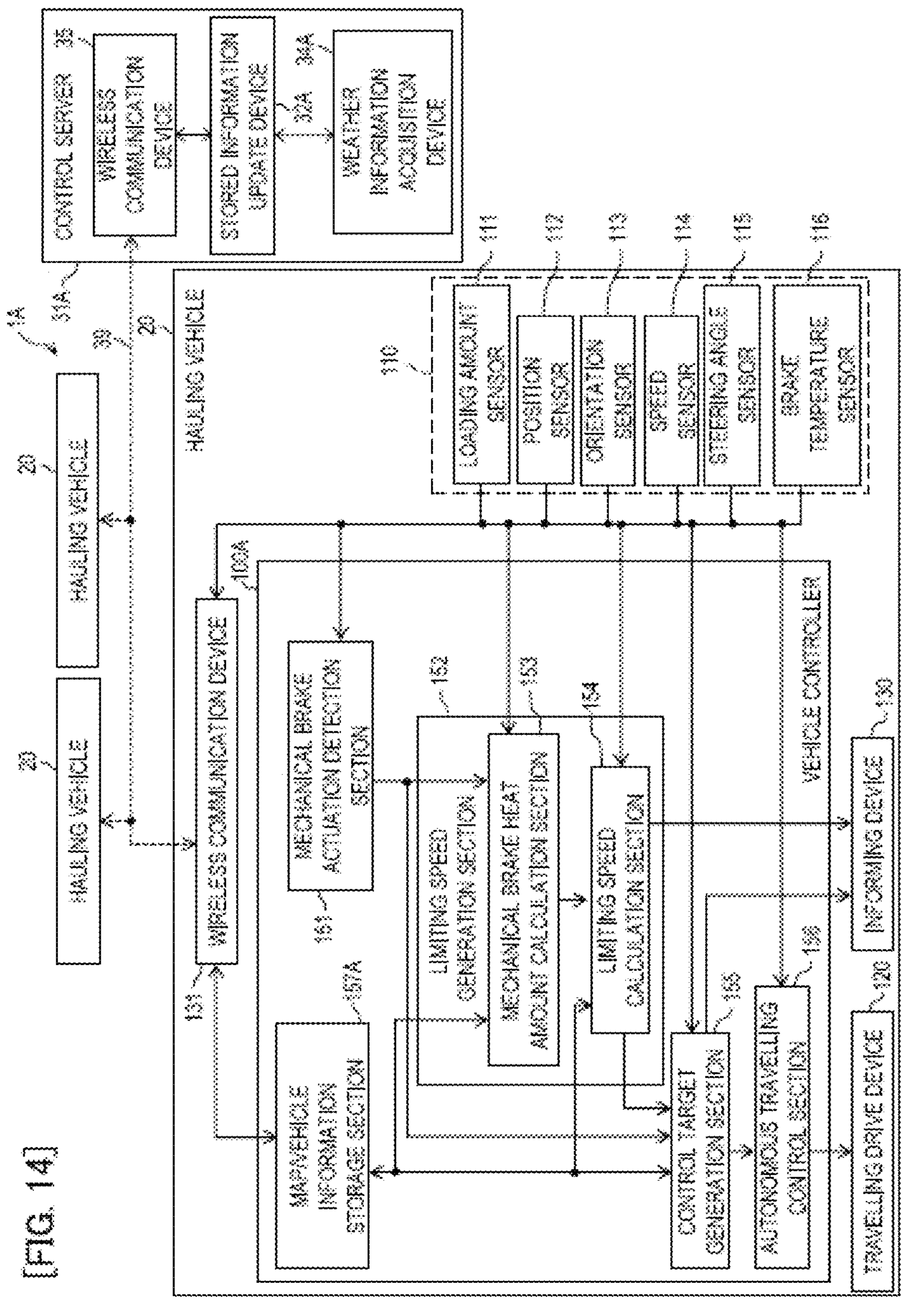
[FIG. 14]
1A
CONTROL SERVER
31A
35
WIRELESS COMMUNICATION DEVICE
STORED INFORMATION UPDATE DEVICE
32A
34A
WEATHER INFORMATION ACQUISITION DEVICE
HAULING VEHICLE
20
30
HAULING VEHICLE
20
HAULING VEHICLE
20
110
LOADING AMOUNT SENSOR
111
POSITION SENSOR
112
ORIENTATION SENSOR
113
SPEED SENSOR
114
STEERING ANGLE SENSOR
115
BRAKE TEMPERATURE SENSOR
116
100A
WIRELESS COMMUNICATION DEVICE
133
MECHANICAL BRAKE ACTUATION DETECTION SECTION
151
152
LIMITING SPEED GENERATION SECTION
153
MECHANICAL BRAKE HEAT AMOUNT CALCULATION SECTION
154
LIMITING SPEED CALCULATION SECTION
VEHICLE CONTROLLER
157A
MAP/VEHICLE INFORMATION STORAGE SECTION
155
CONTROL TARGET GENERATION SECTION
156
AUTONOMOUS TRAVELLING CONTROL SECTION
130
INFORMING DEVICE
120
TRAVELLING DRIVE DEVICE

[FIG. 15]

MAP INFORMATION

| NODE ID | NODE COORDINATES (X, Y) | ROUTE LIMITING SPEED $Va$ | ROUTE GRADIENT $\theta$ | ROAD SURFACE RESISTANCE $Fr$ | ROAD SURFACE RESISTANCE UPDATE CLOCK TIME t |
|---|---|---|---|---|---|
| 1 | $(X_1, Y_1)$ | $V_1$ | $\theta_1$ | $Fr_1$ | $t_1$ |
| 2 | $(X_2, Y_2)$ | $V_2$ | $\theta_2$ | $Fr_2$ | $t_2$ |
| 3 | $(X_3, Y_3)$ | $V_3$ | $\theta_3$ | $Fr_3$ | $t_3$ |
| ... | ... | ... | ... | ... | ... |
| n | $(X_n, Y_n)$ | $V_n$ | $\theta_n$ | $Fr_n$ | $t_n$ |
| ... | ... | ... | ... | ... | ... |

[FIG. 16]
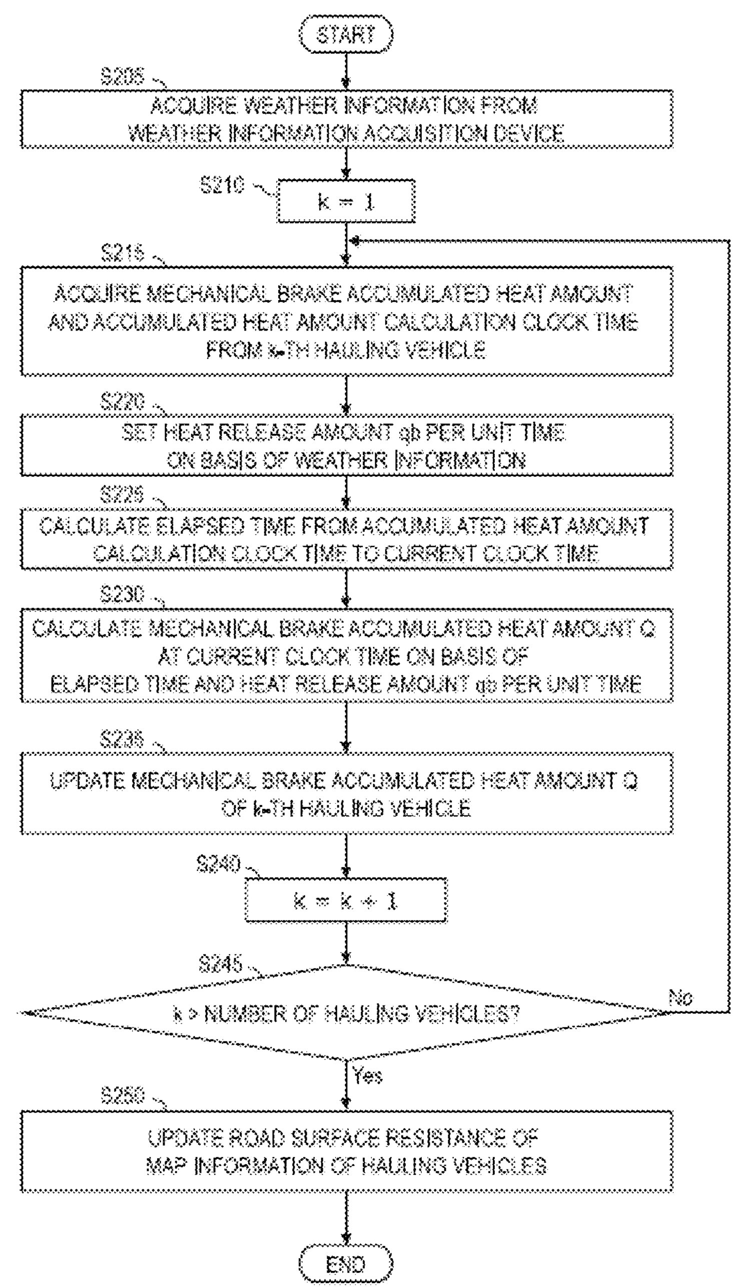

[FIG. 17]
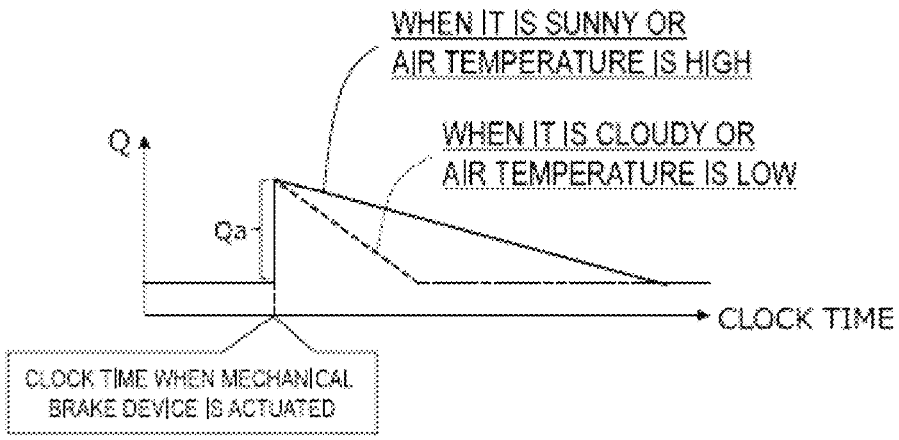

HAULING VEHICLE AND TRAFFIC CONTROL SYSTEM

TECHNICAL FIELD

The present invention relates to a hauling vehicle and a traffic control system.

BACKGROUND ART

As a hauling vehicle capable of autonomous travelling, a dump truck of a series hybrid type including an engine, a generator driven by the engine, electrically driven motors driven by power from the generator, and wheels driven by the electrically driven motors is known.

The dump truck of the series hybrid type includes an electric brake device that decreases the travelling speed by using regenerative torque based on electricity generation of the electrically driven motors as a braking force, and a mechanical brake device that decreases the travelling speed by using a friction force as a braking force. In normal autonomous travelling operation, deceleration control is executed by the electric brake device. Thus, the mechanical brake device hardly wears.

The mechanical brake device is used when a collision with an obstacle is prevented and when an instruction to stop the vehicle has been received. After the mechanical brake device is used, the braking performance thereof lowers due to heat generation and wear. Thus, when the mechanical brake device is used, operation of the hauling vehicle is stopped for maintenance of the mechanical brake device. In the maintenance of the mechanical brake device, whether the braking performance satisfies a reference value is investigated. When the braking performance does not satisfy the reference value, repair is executed.

As above, when the mechanical brake device is used in the hauling vehicle capable of autonomous travelling, the operation time of the hauling vehicle decreases and the work efficiency lowers due to maintenance of the mechanical brake device. Furthermore, the maintenance cost increases if the maintenance of the mechanical brake device is executed every time the mechanical brake device is used.

A technique described in patent document 1 has been proposed as a device that can continue operation without increasing the maintenance cost in the case where a mechanical brake device is used. Patent document 1 discloses an elevator device including a cabin raising-lowering system that raises and lowers a cabin connected to a rope wound around a sheave by turning the sheave by a hoisting machine, an emergency brake that stops the turn of the sheave by friction, and a system control section that controls the cabin raising-lowering system. The emergency brake is a mechanical brake device that stops rotation of a brake disc by sandwiching the brake disc by linings. The system control section has an emergency brake actuation detection section that detects actuation of the emergency brake, a section for acquisition of the speed at the time of emergency brake actuation that acquires the speed of the cabin immediately before the actuation of the emergency brake, a lining wear amount calculation section that calculates the wear amount of the linings of the emergency brake from the speed acquired by the section for acquisition of the speed at the time of emergency brake actuation, and a cabin operation command section that makes a command of operation of the cabin raising-lowering system on the basis of the calculated wear amount.

In the technique described in patent document 1, the speed immediately before the actuation of the mechanical brake device is acquired, and the wear amount of the linings is calculated from the acquired speed. For the wear amount, the amount of increase in the wear amount due to the actuation of the mechanical brake device is added to the wear amount immediately before the actuation of the mechanical brake device. In the technique described in patent document 1, a pause in operation of the elevator is made when the cumulative value of the wear amount has become equal to or larger than the wear amount of the travelling limit of the elevator.

PRIOR ART DOCUMENT

Patent Document

Patent Document 1: JP-2017-178495-A

SUMMARY OF THE INVENTION

Problem to be Solved by the Invention

In patent document 1, description of a mechanical brake device of a hauling vehicle does not exist although description of the mechanical brake device of the elevator exists.

The hauling vehicle such as a dump truck travels on not only a level ground but also a downward slope or upward slope. The influence on the mechanical brake device differs between the case in which the mechanical brake device is actuated on a level ground and the case in which the mechanical brake device is actuated on a slope. Thus, a hauling vehicle that can normally stop the vehicle body by a mechanical brake device on not only a level ground but even a downward slope, and reduce the frequency of maintenance is demanded.

The present invention intends to provide a hauling vehicle that can reduce the frequency of maintenance of a mechanical brake device and normally stop the vehicle body by the mechanical brake device.

Means for Solving the Problem

A hauling vehicle according to one aspect of the present invention includes a vehicle body, wheels disposed on the vehicle body, a position sensor that acquires a position of the vehicle body, an orientation sensor that acquires an orientation of the vehicle body, a speed sensor that acquires travelling speed of the vehicle body, a travelling drive device that includes a mechanical brake device and an electric brake device that give a braking force to the wheels, and drives the wheels. The hauling vehicle also includes a storage device that stores map information including a route shape, a route gradient, and a route limiting speed regarding a travelling route of the vehicle body and a vehicle controller that is configured to generate a control target including a target speed on the basis of the position of the vehicle body, the orientation of the vehicle body, the travelling speed of the vehicle body, and the map information, and controls the travelling drive device to cause the travelling speed of the vehicle body to become the target speed. The vehicle controller is configured to calculate a protection limiting speed of the mechanical brake device, the protection limiting speed increasing along with elapse of a time that starts from detection of actuation of the mechanical brake device and also includes a point of time where the mechanical brake device has become an inactive state after being actuated, on the basis of the travelling speed acquired by the speed sensor and the route gradient included in the map information, and calculate a first distance across which the vehicle body is allowed to travel in a case where the route limiting speed is set as an upper limit value of the target speed after elapse of a maintenance time settled in advance, in a predetermined width of elapsed time that is a width of elapsed time that starts from the detection of the actuation of the mechanical brake device and also includes a point of time where the mechanical brake device has become an inactive state after being actuated. Furthermore, the vehicle controller is configured to calculate a second distance across which the vehicle body is allowed to travel in a case where the protection limiting speed is set as the upper limit value of the target speed, in the predetermined width of the elapsed time starting from the detection of the actuation of the mechanical brake device, and employ a lower speed from either of the protection limiting speed and the route limiting speed as the upper limit value of the target speed and cause the vehicle body to travel, when the first distance is shorter than the second distance, and output a maintenance request instruction while keeping a stopped state of the vehicle body when the first distance is longer than the second distance.

Advantages of the Invention

According to the present invention, it is possible to provide a hauling vehicle that can reduce the frequency of maintenance of the mechanical brake device and normally stop the vehicle body by the mechanical brake device.

BRIEF DESCRIPTION OF THE DRAWINGS

FIG. 1 is a diagram illustrating the schematic configuration of a traffic control system.

FIG. 2 is a diagram illustrating the configuration of a hauling vehicle.

FIG. 3 is a diagram illustrating the hardware configuration of a vehicle controller.

FIG. 4 is a functional block diagram of the vehicle controller according to a first embodiment, and illustrates hardware connected to the vehicle controller and functions of the vehicle controller.

FIG. 5 is a diagram illustrating a travelling route of the hauling vehicle that travels in a transportation path.

FIG. 6 is a diagram illustrating an example of a table of map information stored in a map/vehicle information storage section according to the first embodiment.

FIG. 7 is a diagram illustrating an example of a table of vehicle information stored in the map/vehicle information storage section according to the first embodiment.

FIG. 8 is a flowchart illustrating one example of the flow of calculation processing for a mechanical brake accumulated heat amount Q executed by a mechanical brake heat amount calculation section.

FIG. 9A is a graph illustrating one example of temporal change in the mechanical brake accumulated heat amount Q.

FIG. 9B is a graph illustrating one example of temporal change in a cumulative mechanical brake accumulated heat amount U.

FIG. 10 is a flowchart illustrating one example of the flow of limiting speed calculation processing executed by a limiting speed calculation section.

FIG. 11 is a flowchart illustrating one example of the flow of target speed calculation processing executed by a control target generation section.

FIG. 12 is a time chart illustrating an example of temporal change in a limiting speed Vc and a target speed Vt.

FIG. 13 is a diagram illustrating an example of the difference in the limiting speed depending on whether maintenance exists.

FIG. 14 is a functional block diagram of a vehicle controller according to a second embodiment.

FIG. 15 is a diagram illustrating an example of a table of map information stored in a map/vehicle information storage section according to the second embodiment.

FIG. 16 is a flowchart illustrating one example of the flow of stored information update processing executed by a stored information update device.

FIG. 17 is a graph illustrating one example of temporal change in the mechanical brake accumulated heat amount Q depending on the weather.

MODES FOR CARRYING OUT THE INVENTION

Embodiments of the present invention will be described with reference to the drawings. The following descriptions illustrate specific examples of the contents of the present invention. The present invention is not limited to these descriptions, and various changes and modifications by those skilled in the art are possible within the scope of technical ideas disclosed in the present specification. Furthermore, in all diagrams for explaining the present embodiments, an element having the same function is given the same numeral, and repetitive description thereof is omitted in some cases.

First Embodiment

FIG. 1 is a diagram illustrating the schematic configuration of a traffic control system 1 according to a first embodiment of the present invention. The traffic control system 1 illustrated in FIG. 1 includes at least one or more hauling vehicles 20A and 20B that transport loads such as earth and sand and ore at a work site such as a mine, and a control server 31 that executes traffic control of the hauling vehicles 20A and 20B. Note that the hauling vehicles 20A and 20B are also generically referred to as the hauling vehicle 20. The hauling vehicles 20 travel in transportation paths 10 set from the shape of the work site. The hauling vehicles 20 are unattended vehicles capable of autonomous travelling without a ride by an operator. The control server 31 is disposed in a control station 30 set near the work site or at a place far away from the work site. The control server 31 and the hauling vehicles 20 mutually exchange information through a wireless communication line 39.

The hauling vehicle 20 includes a vehicle body 21 equipped with a vessel (loading platform) on which loads are put and four wheels 22 disposed on the vehicle body 21.

FIG. 2 is a diagram illustrating the configuration of the hauling vehicle 20. As illustrated in FIG. 2, the hauling vehicle 20 includes a travelling drive device 120 that drives the wheels 22 and a vehicle controller 100 that controls the travelling drive device 120. The travelling drive device 120 has an engine 121, a generator 122 driven by the engine 121, a power controller 123 that controls power generated by the generator 122 and supplies the power to travelling motors 124L and 124R, the travelling motors 124L and 124R that drive the wheels 22, a steering device 125 that steers the wheels 22, and brake devices (electric brake device 126 and mechanical brake device 127) that give a braking force to the wheels 22.

The travelling motors 124L and 124R are electrically driven motors for accelerating the vehicle body 21. The power supplied to the travelling motors 124L and 124R is controlled by the power controller 123, and the rotation speed of the travelling motors 124L and 124R is controlled.

The power controller 123 is connected to the vehicle controller 100, and the vehicle controller 100 controls the power controller 123. The vehicle controller 100 controls the steering device 125 and the brake devices through the power controller 123.

The steering device 125 includes a steering motor for changing the steering angle.

The brake devices include the electric brake device 126 and the mechanical brake device 127. The electric brake device 126 is a regenerative brake device that decreases the travelling speed by using, as a braking force, regenerative torque based on electricity generation of the travelling motors 124L and 124R as electrically driven motors. The mechanical brake device 127 is a mechanical brake device of a friction type that can generate a larger braking force than the electric brake device 126. The mechanical brake device 127 is, for example, a disc brake device disposed in the wheels 22 and decreases the travelling speed by using a friction force as a braking force.

The electric brake device 126 is used for deceleration and stop of the vehicle in normal times. On the other hand, the mechanical brake device 127 is used for deceleration and stop of the vehicle in case of an emergency. The case of an emergency includes the case in which an obstacle with a possibility of a collision is detected around the hauling vehicle 20 by the vehicle controller 100, the case in which an emergency stop signal is transmitted from the control server 31 to the hauling vehicle 20, and the like. In case of an emergency, the electric brake device 126 and the mechanical brake device 127 are actuated in a cooperative manner, and a braking force by the cooperative brake is generated. Note that, when the brake devices are actuated in case of an emergency, a braking force is generated and the vehicle body 21 decelerates to stop, and thereafter the stop state of the vehicle body 21 is kept. When the actuation of the brake devices is deactivated, the braking force disappears. By driving of the travelling motors 124L and 124R in the state in which the actuation of the brake devices has been deactivated, the vehicle body 21 starts travelling.

Furthermore, as illustrated in FIG. 3, the hauling vehicle 20 includes a sensor device 110 that senses various physical quantities and the vehicle controller 100 that controls the travelling drive device 120 on the basis of a signal and so forth from the sensor device 110.

FIG. 3 is a diagram illustrating the hardware configuration of the vehicle controller 100. As illustrated in FIG. 3, the vehicle controller 100 is configured by a computer including a processing device 101 such as a CPU (Central Processing Unit), MPU (Micro Processing Unit), or DSP (Digital Signal Processor), a non-volatile memory 102 such as a ROM (Read Only Memory), flash memory, or hard disk drive, a volatile memory 103 what is called a RAM (Random Access Memory), an input interface 104, an output interface 105, and other peripheral circuits. These pieces of hardware cooperate to operate software and implement a plurality of functions. Note that the vehicle controller 100 may be configured by one computer or be configured by a plurality of computers. Furthermore, as the processing device 101, an ASIC (application specific integrated circuit), FPGA (Field Programmable Gate Array), or the like can be used.

The non-volatile memory 102 is a non-volatile storage medium from and to which information can be read and written. An OS (Operating System), control programs that can execute various computations, application programs, thresholds used for various computations, databases, and the like are stored in the non-volatile memory 102. That is, the non-volatile memory 102 is a storage device (storage medium) from which programs that implement functions of the present embodiment can be read. The processing device 101 is a device that loads the program stored in the non-volatile memory 102 into the volatile memory 103 and executes computation, and executes predetermined computation processing for data taken in from the input interface 104, the non-volatile memory 102, and the volatile memory 103 in accordance with the program.

The input interface 104 converts a signal input from the sensor device 110 or the like to allow computation performed by the processing device 101. Moreover, the output interface 105 generates a signal for output according to a computation result in the processing device 101, and outputs the signal to the travelling drive device 120, an informing device 130, and so forth.

FIG. 4 is a functional block diagram of the vehicle controller 100, and illustrates hardware connected to the vehicle controller 100 and functions of the vehicle controller 100.

The hardware connected to the vehicle controller 100 will be described with reference to FIG. 4. The sensor device 110, the travelling drive device 120, the informing device 130, and a wireless communication device 131 are connected to the vehicle controller 100. The wireless communication device 131 is a communication device capable of wireless communication with a wireless base station that configures part of the wireless communication line 39, and has a communication interface including a communication antenna that employs a band such as, for example, a 2.1-GHz band as the reception band. The wireless communication device 131 exchanges information with the control server 31 through the wireless communication line 39. The wireless communication line 131 is a wide area network such as a mobile phone communication network (mobile communication network) developed by a mobile phone carrier or the Internet.

The informing device 130 informs of a maintenance request of the hauling vehicle 20 in response to a maintenance request instruction output from the vehicle controller 100. For example, the informing device 130 is an LED display instrument attached to an outer shell of the vehicle body 21, and turns on an LED with a color according to the maintenance request instruction when the maintenance request instruction is received. Furthermore, the informing device 130 may be a sound output device (ringing device) that outputs a sound (horn sounding) according to the maintenance request instruction when the maintenance request instruction is received.

The sensor device 110 includes various sensors. The sensor device 110 has a loading amount sensor 111, a position sensor 112, an orientation sensor 113, a speed sensor 114, a steering angle sensor 115, and a brake temperature sensor 116.

The loading amount sensor 111 is a sensor for acquiring the loading amount of the hauling vehicle 20. For example, the loading amount sensor 111 senses the load that acts on a suspension of the hauling vehicle 20 or the pressure of a hydraulic operating fluid in a hydraulic cylinder (suspension cylinder), and computes the loading amount of the hauling vehicle 20 on the basis of the sensing result.

The position sensor 112 is a sensor for acquiring the position of the vehicle body 21 (vehicle position). The orientation sensor 113 is a sensor for acquiring the orientation of the vehicle body 21 (direction of the hauling vehicle 20). For example, the position sensor 112 and the orientation sensor 113 have a plurality of antennas for GNSS (Global Navigation Satellite System: global satellite positioning system) (hereinafter, described as GNSS antennas) and a positioning computation device that computes the position of the vehicle body 21 represented by real coordinates in a three-dimensional space and the azimuth that is the angle from a reference orientation on the basis of satellite signals (GNSS radio waves) from a plurality of positioning satellites received by the GNSS antennas. For example, the position of the vehicle body 21 is represented by position coordinates of the vehicle body 21 in a geographic coordinate system (global coordinate system).

Note that the position sensor 112 and the orientation sensor 113 may be configured by a single GNSS antenna and the positioning computation device. In this case, the orientation sensor 113 computes the azimuth from the locus of the position of the vehicle body 21. Moreover, for example, the orientation sensor 113 may be a sensor including an IMU (Inertial Measurement Unit: inertial measurement device) and a computation device that computes the azimuth from temporal change in angular acceleration information sensed by the IMU.

The speed sensor 114 is a sensor for acquiring a travelling speed (vehicle speed) V of the vehicle body 21. For example, the speed sensor 114 is a wheel speed sensor that senses the rotation speed of the wheels 22. Note that the speed sensor 114 may be a device that computes the speed from temporal change in the position of the vehicle body 21 computed by the position sensor 112.

The steering angle sensor 115 is a sensor for acquiring the steering angle of the hauling vehicle 20. For example, the steering angle sensor 115 is an angle sensor such as an encoder attached to the steering device 125.

The brake temperature sensor 116 is a sensor for acquiring the temperature of the mechanical brake device 127 (hereinafter, also referred to as mechanical brake temperature) of the hauling vehicle 20. For example, the brake temperature sensor 116 measures the ambient temperature of the mechanical brake device 127 as the mechanical brake temperature.

Figure 5:
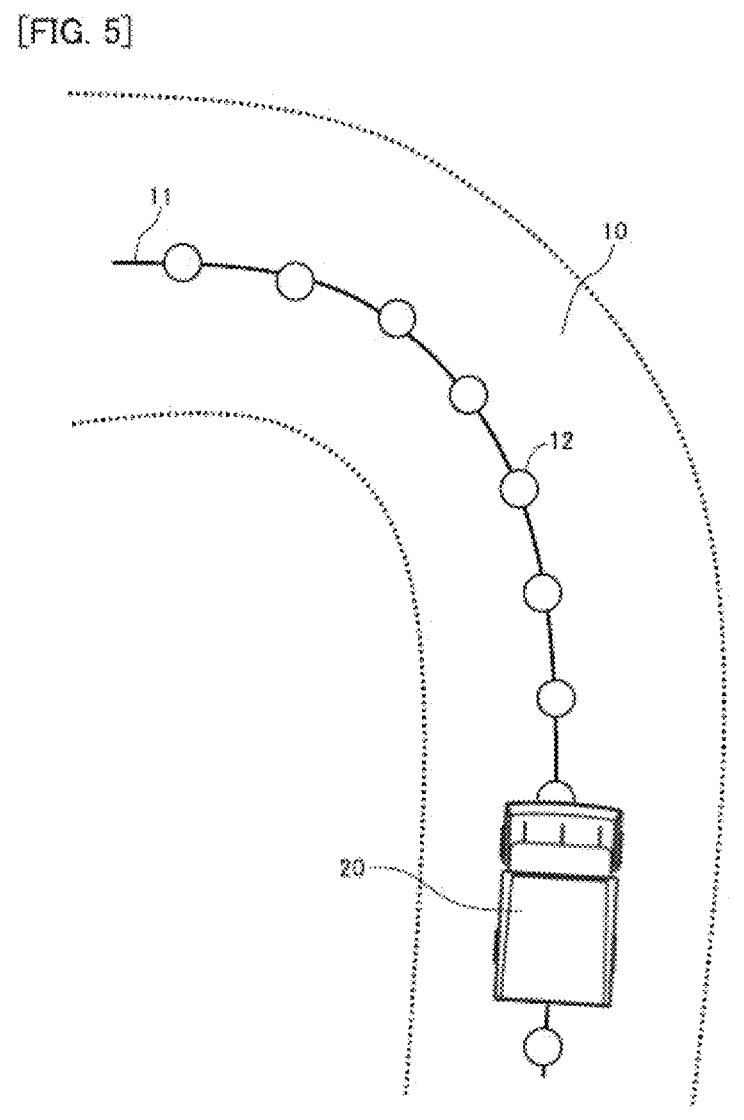

The vehicle controller 100 controls operation of the hauling vehicle 20. FIG. 5 is a diagram illustrating a travelling route 11 of the hauling vehicle 20 that travels in the transportation path 10. As illustrated in FIG. 5, the vehicle controller 100 outputs a travelling control command to the travelling drive device 120 in order to execute autonomous travelling along the travelling route 11. The brake operation amount, the accelerator operation amount, and the steering angle operation amount are included in the travelling control command.

The travelling route 11 is identified by a plurality of nodes 12. Information relating to the plurality of nodes 12 is stored in a map/vehicle information storage section 157 (see FIG. 4) as described later. The travelling route 11 is data indicating a curve in the transportation path 10, and the nodes 12 are data indicating coordinates on the travelling route 11. The vehicle controller 100 may cause the hauling vehicle 20 to autonomously travel in such a manner that the deviation from the travelling route 11 becomes the minimum, or cause the hauling vehicle 20 to autonomously travel in such a manner that the hauling vehicle 20 passes on the nodes 12. In the present embodiment, a curve that passes through the center of the transportation path 10 is employed as the travelling route 11. Furthermore, the nodes 12 are disposed at equal intervals on the travelling route 11.

The vehicle controller 100 generates a control target including a target speed Vt on the basis of the position of the vehicle body 21 acquired by the position sensor 112, the orientation of the vehicle body 21 acquired by the orientation sensor 113, the travelling speed V of the vehicle body 21 acquired by the speed sensor 114, and map information stored in the non-volatile memory 102, and controls the travelling drive device 120 in such a manner that the travelling speed V of the vehicle body 21 becomes the target speed Vt.

Details of functions of the vehicle controller 100 will be described with reference to FIG. 4. As illustrated in FIG. 4, the vehicle controller 100 has functions as a mechanical brake actuation detection section 151, a limiting speed generation section 152, a control target generation section 155, an autonomous travelling control section 156, and the map/vehicle information storage section 157. Functions as the map/vehicle information storage section 157 are exerted by the non-volatile memory 102. Functions of the mechanical brake actuation detection section 151, the limiting speed generation section 152, the control target generation section 155, and the autonomous travelling control section 156 are exerted by execution, by the processing device 101, of a program stored in the non-volatile memory 102.

The map/vehicle information storage section 157 has a map information storage area that stores the map information in a table format and a vehicle information storage area that stores vehicle information in a table format. Moreover, various thresholds are stored in the map/vehicle information storage section 157. The map information stored in the map/vehicle information storage section 157 will be described with reference to FIG. 6. FIG. 6 is a diagram illustrating an example of a table of the map information.

As illustrated in FIG. 6, the map information is information on a series of nodes that define the route shape, the route gradient, the route limiting speed, and so forth regarding the travelling route 11 (see FIG. 5) of the vehicle body 21 (vehicle including this map information). Specifically, in the map information, a node ID, node coordinates (X, Y), a route limiting speed Va, a route gradient θ, and a road surface resistance Fr are defined regarding each node.

The node ID is identification information of the node. The node coordinates are position information of the node that defines the route shape of the travelling route 11. For example, the node coordinates are coordinates in a site coordinate system with the origin of coordinates set at a work site. The site coordinate system is a two-dimensional orthogonal coordinate system formed of X- and Y-coordinates. Note that coordinates in a geographic coordinate system may be used as the node coordinates. Transformation is possible between the coordinates in the site coordinate system and the coordinates in the geographic coordinate system. The route limiting speed Va is defined as the upper limit value of the travelling speed at which the vehicle body 21 can be normally stopped by the mechanical brake device 127 on the basis of an assumption that the mechanical brake device 127 has not been used. Furthermore, the route limiting speed Va is defined while at least one of the curvature and the route gradient θ of the travelling route 11 is also taken into consideration. Note that the curvature of the travelling route 11 can be obtained as the reciprocal of the radius of a circle having a predetermined number of nodes 12 on the circumference. Moreover, the curvature of the travelling route 11 may be obtained as the reciprocal of the turning radius of a travelling locus calculated from temporal change in the azimuth of the vehicle body 21 or the position of the vehicle body 21 when the hauling vehicle 20 is caused to travel along the travelling route 11 in advance by a manned travelling test or the like.

The route gradient θ is the inclination of the travelling route 11 of the hauling vehicle 20 with respect to the horizontal direction. The road surface resistance Fr is a force that acts on the wheels 22 in the opposite direction to the travelling direction of the hauling vehicle 20. Note that a resistance coefficient may be included in the map information instead of the road surface resistance Fr. The resistance coefficient is a coefficient used for calculation of the road surface resistance. For example, the road surface resistance is calculated by multiplying this resistance coefficient by the load applied from the wheels 22 to the road surface (load applied from the road surface to the wheels 22).

In the map/vehicle information storage section 157 illustrated in FIG. 4, the map information of the section necessary for travelling by the hauling vehicle 20 is stored in advance. The map information stored in the map/vehicle information storage section 157 is updated by information transmitted from the control server 31. The control server 31 includes a stored information update device 32 that updates information in the non-volatile memory 102 included in the hauling vehicle 20. The stored information update device 32 transmits map update information that defines the exclusive travelling route 11 to each hauling vehicle 20 through a wireless communication device 35 so that a plurality of hauling vehicles 20 may be kept from getting contact with each other. The vehicle controller 100 updates the map information stored in the map/vehicle information storage section 157 on the basis of the map update information received through the wireless communication device 131.

Note that the map information is not limited to the case where it is updated. The map information defined in advance may be retained without being updated on the basis of information from the control server 31. In this case, the control server 31 transmits a deceleration command or stop command to the predetermined hauling vehicle 20 on the basis of the position of each hauling vehicle 20 in order to avoid contact of a plurality of hauling vehicles 20 with each other.

The vehicle information stored in the map/vehicle information storage section 157 will be described with reference to FIG. 7. FIG. 7 is a diagram illustrating an example of a table of the vehicle information. As illustrated in FIG. 7, the vehicle information includes a mechanical brake accumulated heat amount Q, a cumulative mechanical brake accumulated heat amount U that is the cumulative value of the mechanical brake accumulated heat amount Q, and an accumulated heat amount calculation clock time T that is the clock time when the mechanical brake accumulated heat amount Q and the cumulative mechanical brake accumulated heat amount U have been calculated. The vehicle information is updated by a mechanical brake heat amount calculation section 153 to be described later.

The mechanical brake actuation detection section 151 illustrated in FIG. 4 detects actuation of the mechanical brake device 127 when the decrease rate of the travelling speed V acquired by the speed sensor 114 has become equal to or higher than a decrease rate threshold settled in advance from the state in which the decrease rate is lower than the decrease rate threshold. Note that the mechanical brake actuation detection section 151 may detect actuation of the mechanical brake device 127 when the increase rate of the brake temperature acquired by the brake temperature sensor 116 has become equal to or higher than a threshold settled in advance.

The limiting speed generation section 152 has the mechanical brake heat amount calculation section 153 and a limiting speed calculation section 154. When actuation of the mechanical brake device 127 is detected by the mechanical brake actuation detection section 151, the mechanical brake heat amount calculation section 153 calculates the accumulated heat amount (hereinafter, also referred to as mechanical brake accumulated heat amount) Q of the mechanical brake device 127 on the basis of the travelling speed V of the vehicle body 21 acquired by the speed sensor 114. The mechanical brake accumulated heat amount Q is the amount of heat accumulated in the mechanical brake device 127 due to actuation of the mechanical brake device 127. The mechanical brake heat amount calculation section 153 associates the calculated mechanical brake accumulated heat amount Q with the accumulated heat amount calculation clock time T that is the clock time when the mechanical brake accumulated heat amount Q has been calculated, and stores them in the map/vehicle information storage section 157.

The mechanical brake heat amount calculation section 153 adds the calculated mechanical brake accumulated heat amount Q (more specifically, heat generation amount Qa to be described later) to the cumulative mechanical brake accumulated heat amount U stored in the map/vehicle information storage section 157, to store the addition result in the map/vehicle information storage section 157 as the new cumulative mechanical brake accumulated heat amount U.

After calculating the mechanical brake accumulated heat amount Q accumulated due to the actuation of the mechanical brake device 127, the mechanical brake heat amount calculation section 153 calculates an amount Qb of heat release from the mechanical brake device 127 and lowers the mechanical brake accumulated heat amount Q by the calculated heat release amount Qb. By subtracting the heat release amount Qb in a predetermined time from the mechanical brake accumulated heat amount Q in every predetermined time, the mechanical brake accumulated heat amount Q that lowers over time is calculated.

The limiting speed calculation section 154 calculates a protection limiting speed Vb on the basis of the mechanical brake accumulated heat amount Q calculated by the mechanical brake heat amount calculation section 153. The protection limiting speed Vb becomes lower as the mechanical brake accumulated heat amount Q is larger. The mechanical brake accumulated heat amount Q increases when actuation of the mechanical brake device 127 is detected, and thereafter gradually decreases (see FIG. 9A). Thus, the protection limiting speed Vb has a characteristic in which it increases along with the elapse of the time that starts from detection of actuation of the mechanical brake device 127 and also includes the point of time where the mechanical brake device 127 has become an inactive state after being actuated.

The control target generation section 155 generates the control target including the target speed Vt and a target steering angle on the basis of the protection limiting speed Vb calculated by the limiting speed calculation section 154, the map information including the route limiting speed Va, and the vehicle information. The autonomous travelling control section 156 generates a control command on the basis of the control target generated by the control target generation section 155, the travelling speed V acquired by the speed sensor 114, and the steering angle acquired by the steering angle sensor 115. The autonomous travelling control section 156 outputs the generated control command to the travelling drive device 120. This causes the respective sections of the travelling drive device 120 to be controlled, and the vehicle body 21 travels along the travelling route 11. Note that detailed functions of the mechanical brake heat amount calculation section 153, the limiting speed calculation section 154, and the control target generation section 155 will be described later.

The processing procedure of calculation of the mechanical brake accumulated heat amount Q will be described with reference to FIG. 8. FIG. 8 is a flowchart illustrating one example of the flow of calculation processing for the mechanical brake accumulated heat amount Q executed by the mechanical brake heat amount calculation section 153. For example, the processing illustrated in the flowchart of FIG. 8 is started in response to activation of the vehicle controller 100 and is repeatedly executed at a predetermined control cycle (computation cycle).

As illustrated in FIG. 8, in a step S100, the mechanical brake heat amount calculation section 153 acquires the map information and the vehicle information from the map/vehicle information storage section 157, and forwards the processing to a step S105. In the step S105, the mechanical brake heat amount calculation section 153 determines whether actuation of the mechanical brake device 127 has been detected or not by the mechanical brake actuation detection section 151. When it is determined that actuation of the mechanical brake device 127 has been detected, in the step S105, the processing proceeds to a step S110. When it is determined that actuation of the mechanical brake device 127 has not been detected in the step S105, the processing proceeds to a step S130.

In the step S110, the mechanical brake heat amount calculation section 153 acquires a loading amount W acquired by the loading amount sensor 111 and the travelling speed V acquired by the speed sensor 114, and forwards the processing to a step S115.

In the step S115, the mechanical brake heat amount calculation section 153 calculates the amount of heat (hereinafter, also referred to as the heat generation amount) Qa generated due to the actuation of the mechanical brake device 127. The mechanical brake heat amount calculation section 153 calculates the heat generation amount Qa on the basis of the following formula (1) with an assumption that the kinetic energy of the hauling vehicle 20 is converted to the heat amount.

[Formula 1]

$$Qa = \frac{1}{2}(M + W)V^2 \tag{1}$$

M is the unladen weight of the hauling vehicle 20 (hereinafter, also referred to as the vehicle weight), and is stored in the map/vehicle information storage section 157 in advance. W is the loading amount acquired in the step S110, and V is the travelling speed acquired in the step S110.

When the heat generation amount Qa has been calculated in the step S115, the processing proceeds to a step S120. In the step S120, the mechanical brake heat amount calculation section 153 adds the heat generation amount Qa to the mechanical brake accumulated heat amount Q, and stores the result (Q+Qa) in the map/vehicle information storage section 157 as the new mechanical brake accumulated heat amount Q. This updates the mechanical brake accumulated heat amount Q in the vehicle information of the map/vehicle information storage section 157.

Furthermore, in the step S120, the mechanical brake heat amount calculation section 153 adds the heat generation amount Qa to the cumulative mechanical brake accumulated heat amount U, and stores the result (U+Qa) in the map/vehicle information storage section 157 as the new cumulative mechanical brake accumulated heat amount U. This updates the cumulative mechanical brake accumulated heat amount U in the vehicle information of the map/vehicle information storage section 157.

Moreover, in the step S120, the mechanical brake heat amount calculation section 153 updates the clock time at this time as the accumulated heat amount calculation clock time T in the vehicle information of the map/vehicle information storage section 157. In this manner, in the step S120, the mechanical brake heat amount calculation section 153 updates the vehicle information (T, Q, U) of the map/vehicle information storage section 157 on the basis of the heat generation amount Qa calculated in the step S115.

In the step S130, the mechanical brake heat amount calculation section 153 calculates the amount of heat (hereinafter, also referred to as the heat release amount) Qb released from the mechanical brake device 127. The mechanical brake device 127 generates heat due to actuation, and thereafter releases heat at a predetermined ratio according to the elapse of time. The mechanical brake heat amount calculation section 153 calculates the heat release amount Qb by the following formula (2) with use of a heat release amount qb per unit time, settled in advance by an experiment or the like.

[Formula 2]

$$Qb = qb \times tb \tag{2}$$

qb is the heat release amount per unit time, and is stored in the map/vehicle information storage section 157 in advance. tb is the elapsed time starting from the previous calculation of the mechanical brake accumulated heat amount Q. For example, tb is the elapsed time starting from the accumulated heat amount calculation clock time T in the immediately previous control cycle, and is equivalent to the control cycle in the present flowchart.

When the heat release amount Qb is calculated in the step S130, the processing proceeds to a step S135. In the step S135, the mechanical brake heat amount calculation section 153 subtracts the heat release amount Qb from the mechanical brake accumulated heat amount Q, and stores the result (Q-Qb) in the map/vehicle information storage section 157 as the new mechanical brake accumulated heat amount Q. This updates the mechanical brake accumulated heat amount Q in the vehicle information of the map/vehicle information storage section 157.

Moreover, in the step S135, the mechanical brake heat amount calculation section 153 updates the clock time at this time as the accumulated heat amount calculation clock time T in the vehicle information of the map/vehicle information storage section 157. In this manner, in the step S135, the mechanical brake heat amount calculation section 153 updates the vehicle information (T, Q) of the map/vehicle information storage section 157 on the basis of the heat release amount Qb calculated in the step S130.

When the update processing of the step S120 or the step S135 has ended, the processing illustrated in the flowchart of FIG. 8 ends.

With reference to FIGS. 9A and 9B, description will be made about one example of temporal change in the mechanical brake accumulated heat amount Q and the cumulative mechanical brake accumulated heat amount U calculated by the mechanical brake heat amount calculation section 153. In a graph of FIG. 9A, the abscissa represents the clock time and the ordinate represents the mechanical brake accumulated heat amount Q. In a graph of FIG. 9B, the abscissa represents the clock time and the ordinate represents the cumulative mechanical brake accumulated heat amount U.

As illustrated in FIGS. 9A and 9B, at a clock time ta1, when the mechanical brake device 127 is actuated, the mechanical brake accumulated heat amount Q and the cumulative mechanical brake accumulated heat amount U increase by the heat generation amount Qa. Thereafter, the mechanical brake accumulated heat amount Q gradually decreases due to heat release. At a clock time ta2, when the mechanical brake device 127 is actuated again, the mechanical brake accumulated heat amount Q and the cumulative mechanical brake accumulated heat amount U increase by the heat generation amount Qa. Thereafter, the mechanical brake accumulated heat amount Q gradually decreases due to heat release.

The processing procedure of limiting speed calculation by the limiting speed calculation section 154 will be described with reference to FIG. 10. FIG. 10 is a flowchart illustrating one example of the flow of limiting speed calculation processing executed by the limiting speed calculation section 154. For example, the processing illustrated in the flowchart of FIG. 10 is started in response to activation of the vehicle controller 100 and is repeatedly executed at a predetermined control cycle (computation cycle).

As illustrated in FIG. 10, in a step S140, the limiting speed calculation section 154 acquires the map information and the vehicle information from the map/vehicle information storage section 157, and forwards the processing to a step S143.

In the step S143, the limiting speed calculation section 154 determines whether the mechanical brake accumulated heat amount Q included in the vehicle information acquired in the step S140 is larger than a mechanical brake actuation limit heat amount Qmax or not. The mechanical brake actuation limit heat amount Qmax is a threshold settled on the basis of a limit value under which the mechanical brake device 127 does not break in actuation, and is stored in the map/vehicle information storage section 157 in advance. When it is determined that the mechanical brake accumulated heat amount Q is equal to or smaller than the mechanical brake actuation limit heat amount Qmax in the step S143, the processing proceeds to a step S146. When it is determined that the mechanical brake accumulated heat amount Q is larger than the mechanical brake actuation limit heat amount Qmax in the step S143, the processing proceeds to a step S170.

In the step S146, the limiting speed calculation section 154 determines whether the cumulative mechanical brake accumulated heat amount U included in the vehicle information acquired in the step S140 is larger than a cumulative mechanical brake actuation limit heat amount Umax or not. The cumulative mechanical brake actuation limit heat amount Umax is a threshold settled on the basis of a limit value under which the mechanical brake device 127 does not break in actuation, and is stored in the map/vehicle information storage section 157 in advance. When it is determined that the cumulative mechanical brake accumulated heat amount U is equal to or smaller than the cumulative mechanical brake actuation limit heat amount Umax in the step S146, the processing proceeds to a step S149. When it is determined that the cumulative mechanical brake accumulated heat amount U is larger than the cumulative mechanical brake actuation limit heat amount Umax in the step S146, the processing proceeds to the step S170.

In the step S149, the limiting speed calculation section 154 acquires the position (current position) P of the vehicle body 21 from the position sensor 112, the travelling speed V from the speed sensor 114, and the loading amount W from the loading amount sensor 111, and forwards the processing to a step S152.

In the step S152, the limiting speed calculation section 154 acquires the route gradient θ and the road surface resistance Fr at the position (current position) P of the vehicle body 21 from the map/vehicle information storage section 157, and calculates a braking distance L in the case where the mechanical brake device 127 is actuated, by the following formula (3). The braking distance L is the distance across which the hauling vehicle 20 travels from actuation of the mechanical brake device 127 to vehicle stop (V=0).

[Formula 3]

$$L = \frac{(M+W)V^2}{2(R+G+Fr)} \tag{3}$$

R is a deceleration force (braking force) that can be exerted by the mechanical brake device 127, and is a force in the opposite direction to the travelling direction of the vehicle body 21. The deceleration force R can be settled on the basis of the result of advance measurement of the deceleration force that can be exerted on a level ground. In this case, the deceleration force R is a constant value and is stored in the map/vehicle information storage section 157 in advance. Note that the deceleration force R may be corrected on the basis of the mechanical brake temperature acquired by the brake temperature sensor 116. In this case, a value obtained by decreasing in inverse proportion to the mechanical brake temperature with respect to a reference value of the deceleration force (deceleration force before the correction) stored in the map/vehicle information storage section 157 is calculated as the deceleration force R after the correction.

G is a thrust (gradient resistance) generated by the route gradient θ. Note that G is a force in the travelling direction with a downward slope and is a force in the opposite direction to the travelling direction with an upward slope. The thrust G is calculated from the route gradient θ, the vehicle weight M, the loading amount W, and gravitational acceleration g ($G=(M+W)\times g\times \sin\theta$) on the basis of an assumption that the route gradient θ of the current position continues on the front side of the hauling vehicle 20. Note that the limiting speed calculation section 154 may calculate a thrust G(1) that changes depending on a movement distance 1, by using a route gradient θ(1) acquired from the map information on the basis of the movement distance 1.

As the road surface resistance Fr, a fixed value is set regarding each node in advance on the basis of the soil property of a mine, and the like. M is the vehicle weight and is stored in the map/vehicle information storage section 157 in advance. W is the loading amount, and is acquired by the loading amount sensor 111.

When the braking distance L in the case in which the mechanical brake device 127 is actuated has been calculated in the step S152, the processing proceeds to a step S155. In the step S155, the limiting speed calculation section 154 calculates a change amount ΔN of the potential energy. The limiting speed calculation section 154 calculates an altitude difference h between the current position and a vehicle stop anticipated position on the basis of the braking distance L from the start of actuation of the mechanical brake device 127 to vehicle stop and the route gradient θ of the map information. The altitude difference h is computed from the route gradient θ and the braking distance L (h=L×sin θ) on the basis of an assumption that the route gradient θ of the current position continues on the front side of the hauling vehicle 20. Note that the limiting speed calculation section 154 may compute the altitude difference h by using the route gradient θ(1) according to the movement distance 1 from the current position to the vehicle stop anticipated position. The limiting speed calculation section 154 calculates the change amount ΔN of the potential energy on the basis of the calculated altitude difference h, the vehicle weight M, the loading amount W, and the gravitational acceleration g (ΔN=(M+W)×g×h).

When the change amount ΔN of the potential energy has been calculated in the step S155, the processing proceeds to a step S158. In the step S158, the limiting speed calculation section 154 calculates an allowable kinetic energy Ea with which the mechanical brake device 127 can normally operate until vehicle stop. The limiting speed calculation section 154 calculates a first value Q1 (=Qmax-ΔN-Q) obtained by subtracting the change amount ΔN of the potential energy and the mechanical brake accumulated heat amount Q from the mechanical brake actuation limit heat amount Qmax and a second value Q2 (=Umax-ΔN-U) obtained by subtracting the change amount ΔN of the potential energy and the cumulative mechanical brake accumulated heat amount U from the cumulative mechanical brake actuation limit heat amount Umax. The limiting speed calculation section 154 compares the first value Q1 with the second value Q2, and calculates the smaller value obtained from either of the first value Q1 and the second value Q2, as the allowable kinetic energy Ea (Ea=Min(Q1, Q2)).

When the allowable kinetic energy Ea has been calculated in the step S158, the processing proceeds to a step S161. In the step S161, the limiting speed calculation section 154 calculates the speed with which the mechanical brake device 127 can normally operate until vehicle stop as the protection limiting speed (stoppable speed) Vb on the basis of the allowable kinetic energy Ea, the vehicle weight M, and the loading amount W. The protection limiting speed Vb is calculated by the following formula (4).

[Formula 4]

$$Vb = \sqrt{\frac{2 \times Ea}{M + W}} \quad (4)$$

When the protection limiting speed Vb has been calculated in the step S161, the processing proceeds to a step S164. In the step S164, the limiting speed calculation section 154 compares the route limiting speed Va included in the map information acquired in the step S140 with the protection limiting speed Vb calculated in the step S158, and sets the lower speed as a limiting speed Vc.

When the positive determination is made in the step S143 or the step S146, the processing proceeds to the step S170. In the step S170, the limiting speed calculation section 154 sets the limiting speed Vc to 0 (Vc=0), and forwards the processing to a step S175.

In the step S175, the limiting speed calculation section 154 outputs the maintenance request instruction to the informing device 130. The informing device 130 informs of the maintenance request. When the processing of the step S164 or the step S175 has ended, the processing illustrated in the flowchart of FIG. 10 ends.

When the maintenance request is informed by the informing device 130, a maintenance worker executes maintenance of the mechanical brake device 127. In the maintenance of the mechanical brake device 127, whether the braking performance satisfies a reference value is investigated. When the braking performance does not satisfy the reference value, repair is executed.

Note that, when actuation of the mechanical brake device 127 is detected, the limiting speed generation section 152 calculates, in advance, the limiting speed Vb at the nodes 12 in a predetermined range in the travelling route 11 on the front side of the vehicle body 21 from the vehicle stop anticipated position. The predetermined range includes a range in which the vehicle body 21 can travel in a predetermined width of the elapsed time to be described later.

With reference to FIGS. 11 to 13, the contents of calculation processing for the target speed Vt by the control target generation section 155 will be described. With reference to FIG. 11, the procedure of calculation processing for the target speed by the control target generation section 155 will be described. FIG. 11 is a flowchart illustrating one example of the flow of the target speed calculation processing executed by the control target generation section 155. For example, the processing illustrated in the flowchart of FIG. 11 is started in response to activation of the vehicle controller 100 and is repeatedly executed at a predetermined control cycle (computation cycle).

As illustrated in FIG. 11, in a step S180, the control target generation section 155 determines whether actuation of the mechanical brake device 127 has been detected or not by the mechanical brake actuation detection section 151. When it is determined, in the step S180, that actuation of the mechanical brake device 127 has not been detected, the processing proceeds to a step S185.

In the step S185, the control target generation section 155 calculates the target speed Vt on the basis of the limiting speed Vc. When the limiting speed Vc rises, the control target generation section 155 calculates the target speed Vt in such a manner that the target speed Vt follows the rise in the limiting speed Vc. Furthermore, when the limiting speed Vc decreases, the control target generation section 155 calculates the target speed Vt in such a manner that the actual travelling speed V does not exceed the limiting speed Vc.

FIG. 12 is a time chart illustrating an example of temporal change in the limiting speed Vc and the target speed Vt. In the time chart of FIG. 12, the abscissa represents the clock time and the ordinate represents the limiting speed Vc and the target speed Vt. For example, as illustrated in FIG. 12, the control target generation section 155 calculates the target speed Vt in such a manner that deceleration is started in advance when the limiting speed Vc (=Va) set at a position (node) on the front side separate from the current position of the hauling vehicle 20 by a predetermined distance is lower than the current travelling speed V (=Vc1). The target speed Vt is calculated on the basis of the deceleration degree that can be exerted by the electric brake device 126. The deceleration degree is the change amount (slope) of the speed per unit time.

The control target generation section 155 calculates the deceleration degree in the case where only the electric brake device 126 is used on the basis of the route gradient θ included in the map information and the travelling speed V acquired by the speed sensor 114.

In the example illustrated in FIG. 12, the target speed Vt starts to lower from a clock time tb1 before a clock time tb2 at which the limiting speed Vc starts to lower from Vc1 toward Vc2. In this manner, the control target generation section 155 decreases the target speed Vt at a position closer to the vehicle body 21 relative to the position at which the route limiting speed Va decreases, on the basis of the calculated deceleration degree. This can prevent the travelling speed V from exceeding the limiting speed Vc.

The limiting speed Vc is set to Vc2 at a clock time tb3. Note that the above-described deceleration degree is equivalent to Vc2−Vc1/(tb3−tb2). Thereafter, when the actuation condition of the mechanical brake device 127 is met at a clock time tb4, the limiting speed Vc and the target speed Vt are set to 0 (zero), and the mechanical brake device 127 and the electric brake device 126 are actuated. As a result, the actual travelling speed V (not illustrated) suddenly decreases, and the vehicle body 21 stops (V=0). Note that the actuation condition of the mechanical brake device 127 is met, for example, when an obstacle with a possibility of a collision is detected around the hauling vehicle 20. Furthermore, the actuation condition of the mechanical brake device 127 is met when an emergency stop signal is transmitted from the control server 31 to the hauling vehicle 20. At a clock time tb5, when a travelling start signal is transmitted from the control server 31 to the hauling vehicle 20, the hauling vehicle 20 starts travelling. The target speed Vt rises according to a rise in the limiting speed Vc. Therefore, the travelling speed V of the hauling vehicle 20 gradually rises.

As illustrated in FIG. 11, when it is determined, in the step S180, that actuation of the mechanical brake device 127 has been detected, the processing proceeds to a step S190. In the step S190, the control target generation section 155 calculates a first distance La across which the vehicle body 21 can travel in the case where the route limiting speed Va is set as the upper limit value of the target speed after the elapse of a maintenance time tm settled in advance, in a predetermined width Δt of the elapsed time starting from the detection of the actuation of the mechanical brake device 127. Note that the predetermined width Δt of the elapsed time is a width of the elapsed time also including the point of time where the mechanical brake device 127 has become an inactive state after being actuated. When the first distance La has been calculated, the processing proceeds to a step S192.

In the step S192, the control target generation section 155 calculates a second distance Lb across which the vehicle body 21 can travel in the case where the protection limiting speed Vb is set as the upper limit value of the target speed Vt, in the above-described predetermined width Δt of the elapsed time starting from the detection of the actuation of the mechanical brake device 127. When the second distance Lb has been calculated, the processing proceeds to a step S194.

FIG. 13 is a diagram illustrating an example of the difference in the limiting speed depending on whether maintenance exists or not. As illustrated in FIG. 13, when the actuation condition of the mechanical brake device 127 is met at a clock time tc1, the limiting speed Vc is set to 0 (zero), and the mechanical brake device 127 and the electric brake device 126 are actuated. As a result, the actual travelling speed V (not illustrated) suddenly decreases, and the vehicle body 21 stops (V=0) at a clock time tc2.

The control target generation section 155 calculates the first distance La (equivalent to the area of a dot hatching region in the diagram) that is the travelling distance in the case where the vehicle body 21 travels at the route limiting speed Va from a clock time tc3 after the elapse of the maintenance time tm from the stop of the vehicle body 21 at the clock time tc2 due to the actuation of the mechanical brake device 127, in the predetermined width Δt of the elapsed time starting from the detection of the actuation of the mechanical brake device 127. Note that the route limiting speed Va may discontinuously increase from 0 although the example in which the route limiting speed Va continuously increases from 0 (zero) with a predetermined slope is illustrated in FIG. 13. The maintenance time tm is settled in advance from an experiment or the like, and is stored in the map/vehicle information storage section 157. Moreover, although the vehicle stop clock time tc2 is regarded as the start timing of the maintenance time tm in the example illustrated in FIG. 13, the clock time tc1 at which the actuation of the mechanical brake device 127 is detected may be regarded as the start timing of the maintenance time tm.

The control target generation section 155 calculates the second distance Lb (equivalent to the area of a diagonal hatching region in the diagram) that is the travelling distance in the case where the vehicle body 21 travels at the protection limiting speed Vb, in the predetermined width Δt of the elapsed time starting from the detection of the actuation of the mechanical brake device 127. Note that it may be assumed that the hauling vehicle 20 stops at the clock time tc2 and immediately resumes the travelling. Alternatively, it may be assumed that the hauling vehicle 20 resumes the travelling after the elapse of a predetermined time from the clock time tc2. The mechanical brake accumulated heat amount Q gradually lowers over time after the actuation of the mechanical brake device 127. Thus, the protection limiting speed Vb gradually increases over time.

It is preferable to set the predetermined width Δt of the elapsed time to a value that is equal to or longer than the time ranging from the clock time tc1 at which the actuation of the mechanical brake device 127 is detected, to a clock time tc4 at which the protection limiting speed Vb reaches the route limiting speed Va. Note that the predetermined width (fixed value) Δt of the elapsed time is settled in advance from an experiment or the like and is stored in the map/vehicle information storage section 157.

The predetermined width Δt of the elapsed time is not limited to the case of being set to a fixed value. For example, the control target generation section 155 may compute the predetermined width Δt of the elapsed time on the basis of the travelling speed V where the mechanical brake device 127 has started the actuation. In this case, a data table in which the travelling speed V is associated with the width Δt of the elapsed time is stored in the map/vehicle information storage section 157. This data table defines a characteristic in which the width Δt of the elapsed time becomes larger as the travelling speed V becomes higher.

As illustrated in FIG. 11, in the step S194, the control target generation section 155 determines whether the first distance La calculated in the step S190 is equal to or longer than the second distance Lb calculated in the step S192. When it is determined that the first distance La is equal to or longer than the second distance Lb in the step S194, the processing proceeds to a step S196. When it is determined that the first distance La is shorter than the second distance Lb in the step S194, the processing proceeds to the step S185.

In the step S196, the control target generation section 155 sets the target speed Vt to 0 (Vt=0), and forwards the processing to a step S198. In the step S198, the control target generation section 155 outputs the maintenance request instruction to the informing device 130. The informing device 130 informs of the maintenance request. When the processing of the step S185 or the step S198 has ended, the processing illustrated in the flowchart of FIG. 11 ends.

When the distance (first distance La) across which the vehicle body 21 can travel until the predetermined clock time tc4 in the case where the travelling is resumed after maintenance of the mechanical brake device 127 is executed is longer than the distance (second distance Lb) across which the vehicle body 21 can travel until the predetermined clock time tc4 in the case where the travelling is resumed without execution of maintenance of the mechanical brake device 127, the average speed is high and the productivity improves if maintenance of the mechanical brake device 127 is executed. Thus, in the present embodiment, the vehicle controller 100 outputs the maintenance request instruction to the informing device 130 while keeping the stopped state of the vehicle body 21 when the first distance La is longer than the second distance Lb.

Note that, where the first distance La is shorter than the second distance Lb, the average speed is high and the productivity improves if maintenance of the mechanical brake device 127 is not executed. Thus, in the present embodiment, the vehicle controller 100 employs the lower speed from either of the protection limiting speed Vb and the route limiting speed Va as the upper limit value of the target speed Vt and causes the vehicle body 21 to travel, when the first distance La is shorter than the second distance Lb.

As described above, the vehicle controller 100 according to the present embodiment calculates the mechanical brake accumulated heat amount Q when the braking performance lowers due to heat generation and wear in use of the mechanical brake device 127. The vehicle controller 100 calculates the kinetic energy (allowable kinetic energy) Ea that allows vehicle stop in the state in which the mechanical brake device 127 is normally actuated, on the basis of the potential energy that increases or decreases at the time of vehicle stop calculated from the road surface resistance Fr and the route gradient θ of the front side of the hauling vehicle 20 and the loading amount W, the mechanical brake accumulated heat amount Q, and the mechanical brake actuation limit heat amount Qmax. The vehicle controller 100 calculates the protection limiting speed Vb on the basis of the allowable kinetic energy Ea. The vehicle controller 100 can suppress reduction in the operating time due to maintenance of the mechanical brake device 127, by continuing operation of the hauling vehicle 20 at the protection limiting speed Vb or lower. Moreover, when the travelling distance after the predetermined time with the route limiting speed Va in the case where maintenance is executed is longer than the travelling distance after the predetermined time with the protection limiting speed Vb, the average speed can be improved and the lowering of the productivity can be prevented by requesting maintenance.

According to the above-described embodiment, the following operations and effects are provided.

(1) The hauling vehicle 20 includes the vehicle body 21, the wheels 22 disposed on the vehicle body 21, the position sensor 112 that acquires the position of the vehicle body 21, the orientation sensor 113 that acquires the orientation of the vehicle body 21, and the speed sensor 114 that acquires the travelling speed (vehicle speed) V of the vehicle body 21. The hauling vehicle 20 includes the mechanical brake device 127 and the electric brake device 126 that give a braking force to the wheels 22, and includes the travelling drive device 120 that drives the wheels 22. The hauling vehicle 20 includes the non-volatile memory (storage device) 102 that stores the map information including the node coordinates representing the route shape of the travelling route 11 of the vehicle body 21, the route gradient θ, and the route limiting speed Va. The hauling vehicle 20 includes the vehicle controller 100 that generates the control target including the target speed Vt on the basis of the position of the vehicle body 21, the orientation of the vehicle body 21, the travelling speed V of the vehicle body 21, and the map information and controls the travelling drive device 120 to cause the travelling speed V of the vehicle body 21 to become the target speed Vt.

The vehicle controller 100 calculates the protection limiting speed Vb of the mechanical brake device 127 that increases along with the elapse of the time that starts from detection of actuation of the mechanical brake device 127 and also includes the point of time where the mechanical brake device 127 has become an inactive state after being actuated, on the basis of the travelling speed V acquired by the speed sensor 114 and the route gradient θ included in the map information. The vehicle controller 100 calculates the first distance La across which the vehicle body 21 can travel in the case where the route limiting speed Va is set as the upper limit value of the target speed Vt after the elapse of the maintenance time tm settled in advance, in the predetermined width Δt of the elapsed time that is the width of the elapsed time that stars from the detection of the actuation of the mechanical brake device 127 and also includes the point of time where the mechanical brake device 127 has become an inactive state after being actuated. The vehicle controller 100 calculates the second distance Lb across which the vehicle body 21 can travel in the case where the protection limiting speed Vb is set as the upper limit value of the target speed Vt, in the above-described predetermined width Δt of the elapsed time starting from the detection of the actuation of the mechanical brake device 127. The vehicle controller 100 employs the lower speed from either of the protection limiting speed Vb and the route limiting speed Va as the upper limit value of the target speed Vt and causes the vehicle body 21 to travel, when the first distance La is shorter than the second distance Lb. On the other hand, the vehicle controller 100 outputs the maintenance request instruction while keeping the stopped state of the vehicle body 21 when the first distance La is longer than the second distance Lb.

In this configuration, when the first distance La is shorter than the second distance Lb, the travelling is continued without execution of maintenance and the occurrence of the operation stop time (maintenance time tm) due to the maintenance can be prevented. The protection limiting speed Vb that becomes the upper limit value of the target speed Vt in this case has a characteristic in which it increases along with the elapse of the time starting from the detection of the actuation of the mechanical brake device 127. Due to employing such a characteristic, the travelling speed V is suppressed to be low in the state in which the temperature is high immediately after the actuation of the mechanical brake device 127. Therefore, the vehicle body 21 can be normally stopped even when the mechanical brake device 127 is actuated again during travelling.

Furthermore, the vehicle controller 100 outputs the maintenance request instruction to the informing device 130 when the first distance La is longer than the second distance Lb. This can execute maintenance at a stage before the occurrence of an abnormality in the mechanical brake device 127.

As above, according to the present embodiment, it is possible to provide the hauling vehicle 20 that can reduce the frequency of maintenance of the mechanical brake device 127 and normally stop the vehicle body 21 by the mechanical brake device 127.

(2) The hauling vehicle 20 includes the loading amount sensor 111 that acquires the loading amount of the hauling vehicle 20. The vehicle controller 100 calculates the protection limiting speed Vb while taking the loading amount W acquired by the loading amount sensor 111 into consideration (see FIGS. 8 and 10). According to this configuration, the appropriate protection limiting speed Vb can be calculated according to change in the loading amount W.

(3) The map information includes the road surface resistance Fr of the travelling route 11. The vehicle controller 100 calculates the protection limiting speed Vb while taking the road surface resistance Fr into consideration (see FIG. 10). According to this configuration, the appropriate protection limiting speed Vb can be calculated according to change in the road surface resistance Fr.

(4) The hauling vehicle 20 includes the informing device 130 that informs of the maintenance request of the hauling vehicle 20 in response to the maintenance request instruction. The vehicle controller 100 calculates the mechanical brake accumulated heat amount Q that is the amount of heat accumulated in the mechanical brake device 127 due to actuation of the mechanical brake device 127, when detecting actuation of the mechanical brake device 127. The vehicle controller 100 outputs the maintenance request instruction to the informing device 130 when the calculated mechanical brake accumulated heat amount Q exceeds the predetermined value (mechanical brake actuation limit heat amount) Qmax (Yes in S143, and S170 and S175 in FIG. 10).

Furthermore, the vehicle controller 100 calculates the cumulative mechanical brake accumulated heat amount U that is the cumulative value of the amount of heat accumulated in the mechanical brake device 127 (cumulative value of the heat generation amount Qa) due to actuation of the mechanical brake device 127, when detecting actuation of the mechanical brake device 127. The vehicle controller 100 outputs the maintenance request instruction to the informing device 130 when the calculated cumulative mechanical brake accumulated heat amount U exceeds the predetermined value (cumulative mechanical brake actuation limit heat amount) Umax (Yes in S146, and S170 and S175 in FIG. 10).

According to this configuration, it is possible to prevent the start of travelling in the state in which the mechanical brake device 127 is close to the actuation limit after vehicle stop due to actuation of the mechanical brake device 127.

Second Embodiment

A traffic control system 1A according to a second embodiment of the present invention will be described with reference to FIGS. 14 to 17. Note that a configuration that is the same as or equivalent to the configuration described in the first embodiment is given the same reference numeral and differences will be mainly described.

FIG. 14 is a functional block diagram of a vehicle controller 100A according to the second embodiment. As illustrated in FIG. 14, the traffic control system 1A according to the second embodiment includes two or more hauling vehicles 20 and a control server 31A that executes traffic control of the hauling vehicles 20.

In the first embodiment, the example in which the road surface resistance Fr of each node is a fixed value has been described. In contrast, the vehicle controller 100A according to the second embodiment updates the road surface resistance Fr included in the map information on the basis of an actual measurement value. For example, the vehicle controller 100A estimates the road surface resistance Fr from the ratio of the wheel speed to the travelling speed V during travelling, and updates the road surface resistance Fr included in the map information.

Note that the update method for the road surface resistance Fr is not limited thereto. For example, the vehicle controller 100A calculates the road surface resistance Fr on the basis of the travelling speed V acquired by the speed sensor 114 when actuation of the mechanical brake device 127 has been detected, the position P of the vehicle body 21 (brake actuation position) acquired by the position sensor 112 when the actuation of the mechanical brake device 127 has been detected, the position (stop position) of the vehicle body 21 acquired by the position sensor 112 when the vehicle body 21 has stopped due to the actuation of the mechanical brake device 127, and the route gradient θ of the travelling route 11 from the brake actuation position to the stop position. Then, the vehicle controller 100A updates the road surface resistance Fr of the map information by the calculated road surface resistance Fr. Note that the vehicle controller 100A determines that the vehicle body 21 has stopped when the travelling speed V acquired by the speed sensor 114 has become 0 (zero).

According to this configuration, the accuracy of the road surface resistance Fr of the map information can be enhanced. As a result, the accuracy of the protection limiting speed Vb can be enhanced.

When detecting actuation of the mechanical brake device 127, the vehicle controller 100A calculates the mechanical brake accumulated heat amount Q on the basis of the travelling speed V acquired by the speed sensor 114. The vehicle controller 100A transmits the calculated mechanical brake accumulated heat amount Q and the accumulated heat amount calculation clock time T to the control server 31A.

The hauling vehicle 20 transmits, to the control server 31A, a travelling record (including the map information and the vehicle information) that is information recorded during travelling. The control server 31A collects the travelling records of a plurality of hauling vehicles 20. The control server 31A aggregates the road surface resistances Fr acquired from the plurality of hauling vehicles 20, and updates the map information of each hauling vehicle 20. Due to this, for example, the hauling vehicle 20A can acquire the latest road surface resistance Fr of the node of the travelling route 11 that is the travelling route 11 on which the hauling vehicle 20A has not travelled and on which the hauling vehicle 20B has travelled.

Moreover, the control server 31A acquires weather information and decides the heat release amount qb per unit time on the basis of the acquired weather information. The control server 31A acquires the mechanical brake accumulated heat amount Q calculated by the vehicle controller 100A of the predetermined hauling vehicle 20A and the clock time (accumulated heat amount calculation clock time) T at which the mechanical brake accumulated heat amount Q has been calculated. The control server 31A calculates elapsed time ΔT starting from the accumulated heat amount calculation clock time T, and calculates a post-correction accumulated heat amount Q' obtained by correcting the accumulated heat amount Q of the mechanical brake device 127 on the basis of the elapsed time ΔT and the heat release amount qb per unit time. The control server 31A transmits the post-correction accumulated heat amount Q' to the vehicle controller 100A of the hauling vehicle 20A. The vehicle controller 100A of the hauling vehicle 20A calculates the protection limiting speed Vb on the basis of the post-correction accumulated heat amount Q'. That is, the vehicle controller 100A substitutes the post-correction accumulated heat amount Q' for the mechanical brake accumulated heat amount Q included in the vehicle information stored in a map/vehicle information storage section 157A, and calculates the protection limiting speed Vb.

According to the second embodiment, the vehicle controller 100A can calculate the protection limiting speed Vb more accurately by using the road surface resistance Fr and the post-correction accumulated heat amount Q' acquired from the control server 31A. The traffic control system 1A according to the second embodiment will be described in detail below.

The control server 31A includes a stored information update device 32A and a weather information acquisition device 34A. The hardware configuration of the stored information update device 32A and the weather information acquisition device 34A is similar to the hardware configuration of the vehicle controller 100 illustrated in FIG. 3. That is, the stored information update device 32A and the weather information acquisition device 34A are each configured by a computer including a processing device, a non-volatile memory (storage device), a volatile memory (storage device), input and output interfaces, and other peripheral circuits. The stored information update device 32A and the weather information acquisition device 34A each execute computation of a program, reading and writing of information from and to a work area of the volatile memory, and temporary storage of a program to exert predetermined functions. Note that the stored information update device 32A and the weather information acquisition device 34A may be configured by one computer.

FIG. 15 is a diagram illustrating an example of a table of the map information stored in the map/vehicle information storage section 157A according to the second embodiment. As illustrated in FIG. 15, in the map information stored in the map/vehicle information storage section 157A, a road surface resistance update clock time t is included in addition to the information explained in the first embodiment.

The weather information acquisition device 34A illustrated in FIG. 14 acquires weather information including the weather and the air temperature, and outputs the weather information to the stored information update device 32A. The stored information update device 32A updates the road surface resistance Fr of the map information and the mechanical brake accumulated heat amount Q and the accumulated heat amount calculation clock time T of the vehicle information.

The processing procedure of the stored information update device 32A will be described with reference to FIG. 16. FIG. 16 is a flowchart illustrating one example of the flow of stored information update processing executed by the stored information update device 32A. The stored information update device 32A repeatedly executes the processing illustrated in the flowchart of FIG. 16 at a predetermined control cycle.

As illustrated in FIG. 16, in a step S205, the stored information update device 32A acquires the weather information from the weather information acquisition device 34A, and forwards the processing to a step S210.

In the step S210, the stored information update device 32A sets a variable k to 1, and forwards the processing to a step S215. The variable k is a number for identifying the predetermined hauling vehicle 20 from among a plurality of hauling vehicles 20.

In the step S215, the stored information update device 32A acquires, from the k-th hauling vehicle 20 through the wireless communication device 35, the mechanical brake accumulated heat amount Q and the accumulated heat amount calculation clock time T included in the vehicle information in the map/vehicle information storage section 157A, and forwards the processing to a step S220.

In the step S220, the stored information update device 32A sets the heat release amount qb per unit time on the basis of the weather information, and forwards the processing to a step S225.

For example, the stored information update device 32A has a weather table in which information on the weather (sunny weather, cloudy weather) is associated with the heat release amount qb. In the weather table, a sunny-weather heat release amount qb1 that is the heat release amount qb when it is sunny and a cloudy-weather heat release amount qb2 that is the heat release amount qb when it is cloudy are settled. The stored information update device 32A refers to the weather table, and sets the heat release amount qb on the basis of the weather included in the weather information acquired in the step S205.

Note that a value corresponding to the air temperature may be set as the heat release amount qb per unit time. In this case, the stored information update device 32A compares the air temperature with an air temperature threshold settled in advance, and sets the heat release amount qb according to the comparison result.

FIG. 17 is a graph illustrating one example of temporal change in the mechanical brake accumulated heat amount Q depending on the weather. As illustrated in FIG. 17, when it is sunny or the air temperature is high, the temperature difference between the mechanical brake device 127 and the ambient air is small, and decrease in the mechanical brake accumulated heat amount Q requires a long time. Thus, when it is sunny or the air temperature is high, the heat release amount qb of a small value compared with the case in which it is cloudy or the air temperature is low is set. When it is cloudy or the air temperature is low, the temperature difference between the mechanical brake device 127 and the ambient air is large, and the mechanical brake accumulated heat amount Q decreases early compared with the case in which it is sunny or the air temperature is high. Thus, when it is cloudy or the air temperature is low, the heat release amount qb of a large value compared with the case in which it is sunny or the air temperature is high is set.

As illustrated in FIG. 16, in the step S225, the stored information update device 32A calculates elapsed time td from the accumulated heat amount calculation clock time T to the current clock time, and forwards the processing to a step S230.

In the step S230, the stored information update device 32A calculates the mechanical brake accumulated heat amount Q at the current clock time on the basis of the heat release amount qb per unit time and the elapsed time td. The stored information update device 32A calculates the heat release amount Qb in the period from the previous calculation of the accumulated heat amount to the current clock time (Qb=qb×td), and subtracts the heat release amount Qb from the mechanical brake accumulated heat amount Q to calculate the current mechanical brake accumulated heat amount Q.

When the current mechanical brake accumulated heat amount Q has been calculated in the step S230, the processing proceeds to a step S235. In the step S235, the stored information update device 32A updates the mechanical brake accumulated heat amount Q included in the vehicle information of the non-volatile memory 102 of the k-th hauling vehicle 20 through the wireless communication device 35, and forwards the processing to a step S240.

In the step S240, the stored information update device 32A adds 1 to the variable k, and forwards the processing to a step S245.

In the step S245, the stored information update device 32A determines whether the variable k is larger than the number of hauling vehicles 20 that are the objects of the control. When it is determined that the variable k is equal to or smaller than the number of hauling vehicles 20 in the step S245, the processing proceeds to the step S215. When it is determined that the variable k is larger than the number of hauling vehicles 20 in the step S245, the processing proceeds to a step S250.

In the step S250, the stored information update device 32A acquires the road surface resistance Fr of each node from the map information of all hauling vehicles 20, and transmits the latest value of the road surface resistance Fr of each node to all hauling vehicles 20. Each hauling vehicle 20 replaces the road surface resistance Fr included in the map information stored in the map/vehicle information storage section 157A by the received latest road surface resistance Fr. That is, the hauling vehicles 20 update the map information on the basis of the information from the control server 31A. When the update processing for the road surface resistance Fr of the map information has ended in the step S250, the processing illustrated in the flowchart of FIG. 16 ends.

According to the present embodiment, the vehicle controller 100A can acquire the latest road surface resistance Fr estimated from the travelling record of not only the vehicle including this vehicle controller 100A but also the other vehicles. Furthermore, the vehicle controller 100A can acquire the mechanical brake accumulated heat amount Q calculated on the basis of the heat release amount qb set in consideration of the weather information. Thus, the vehicle controller 100A can calculate the protection limiting speed Vb more accurately. As a result, the vehicle body 21 can be normally stopped more surely.

The following modification examples are also within the scope of the present invention, and it is also possible to combine a configuration illustrated in the modification example and a configuration explained in the above-described embodiment, combine configurations explained in the above-described different embodiments with each other, and combine configurations to be explained in the following different modification examples with each other.

Modification Example 1

In the first embodiment, description has been made about the example in which the loading amount sensor 111 is disposed in the hauling vehicle 20 and the vehicle controller 100 calculates the protection limiting speed Vb on the basis of the loading amount W and the travelling speed V. However, the present invention is not limited thereto.

Modification Example 1-1

The vehicle controller 100 may calculate the protection limiting speed Vb without using the loading amount W acquired by the loading amount sensor 111. In this case, it is preferable to employ, as the vehicle weight M, not the unladen vehicle weight but the vehicle weight arising from addition of the maximum loading capacity.

Modification Example 1-2

The vehicle controller 100 may calculate the protection limiting speed Vb without taking the road surface resistance Fr included in the map information into consideration.

Modification Example 2

The computation method for the mechanical brake accumulated heat amount Q is not limited to the method explained in the above-described embodiments.

Modification Example 2-1

The heat generation amount Qa of the mechanical brake device 127 is in a proportional relationship with the amount of temperature change (temperature rise) of the mechanical brake device 127 due to heat generation. Thus, when detecting actuation of the mechanical brake device 127, the vehicle controller 100 may calculate the heat generation amount Qa on the basis of change in the temperature of the mechanical brake device 127 acquired by the brake temperature sensor 116. The vehicle controller 100 calculates the mechanical brake accumulated heat amount Q accumulated in the mechanical brake device 127, on the basis of the calculated heat generation amount Qa.

In this manner, in the present modification example, the vehicle controller 100 calculates the mechanical brake accumulated heat amount Q on the basis of the temperature of the mechanical brake device 127, and calculates the protection limiting speed Vb on the basis of the mechanical brake accumulated heat amount Q. According to this configuration, the mechanical brake accumulated heat amount Q can be calculated more accurately.

Modification Example 2-2

The mechanical brake heat amount calculation section 153 may calculate the heat generation amount Qa by the following formula (5) in consideration of an amount ΔN of change in the potential energy from the actuation start of the mechanical brake device 127 to vehicle stop.

[Formula 5]

$$Qa = \frac{1}{2}(M + W)V^2 + \Delta N \tag{5}$$

The change amount ΔN of the potential energy is calculated on the basis of the braking distance L from the start of actuation of the mechanical brake device 127 to vehicle stop, the route gradient θ of the map information, the loading amount W, and the vehicle weight M. Note that, although description has been made about the example in which the braking distance L is calculated by formula (3) in the above-described embodiment, the braking distance L may be calculated as an integral value of the travelling speed V or be calculated as the variation amount of the vehicle position.

In this manner, the vehicle controller 100 according to the present modification example calculates the mechanical brake accumulated heat amount Q on the basis of the route gradient θ and the travelling speed V acquired by the speed sensor 114 when detecting actuation of the mechanical brake device 127. Moreover, the vehicle controller 100 calculates the protection limiting speed Vb on the basis of the calculated mechanical brake accumulated heat amount Q. According to this configuration, the protection limiting speed Vb can be calculated more accurately when the hauling vehicle 20 travels on a downward slope or the like.

Modification Example 2-3

The heat generation amount Qa may be stored as a fixed value in the map/vehicle information storage section 157 in advance. In this case, the heat generation amount Qa is settled from the measurement result of the amount of heat generation caused by one time of actuation of the mechanical brake device 127, by an experiment or the like.

Modification Example 2-4

Furthermore, the mechanical brake heat amount calculation section 153 may calculate the heat generation amount Qa by the following formula (6) by using a heat generation amount qa per unit time settled by an experiment or the like in advance.

[Formula 6]

$$Qa = qa \times te \tag{6}$$

qa is the heat generation amount per unit time, and is stored in the map/vehicle information storage section 157 in advance, the is the elapsed time ranging from the start of actuation of the mechanical brake device 127 to vehicle stop.

Modification Example 3

In the first embodiment, description has been made about the example in which, in the step S146 in FIG. 10, the cumulative mechanical brake accumulated heat amount U and the cumulative mechanical brake actuation limit heat amount Umax of the mechanical brake device 127 are compared with each other, and on the basis of the comparison result, whether the mechanical brake device 127 has reached the actuation limit (wear limit) or not is determined. However, instead of the processing of the step S146 in FIG. 10, the cumulative mechanical brake wear amount may be compared with the cumulative mechanical brake limit wear amount, and on the basis of the comparison result, whether the mechanical brake device 127 has reached the actuation limit (wear limit) or not may be determined.

The cumulative mechanical brake wear amount is in a certain relationship with the cumulative mechanical brake accumulated heat amount. The limiting speed calculation section 154 converts the cumulative mechanical brake accumulated heat amount into the cumulative mechanical brake wear amount. Moreover, the limiting speed calculation section 154 determines whether the cumulative mechanical brake wear amount is larger than the cumulative mechanical brake actuation limit wear amount. The cumulative mechanical brake actuation limit wear amount is a threshold settled on the basis of a limit value under which the mechanical brake device 127 does not break in actuation, and is stored in the map/vehicle information storage section 157 in advance. When determining in the step S146 that the cumulative mechanical brake wear amount is equal to or smaller than the cumulative mechanical brake actuation limit wear amount, the limiting speed calculation section 154 forwards the processing to the step S149. When determining in the step S146 that the cumulative mechanical brake wear amount is larger than the cumulative mechanical brake actuation limit wear amount, the limiting speed calculation section 154 forwards the processing to the step S170.

According to such a modification example, operations and effects similar to those of the above-described embodiments can be provided.

Although the embodiments of the present invention have been described above, the above-described embodiments have merely illustrated part of application examples of the present invention and do not intend to limit the technical scope of the present invention to the specific configurations of the above-described embodiments.

DESCRIPTION OF REFERENCE CHARACTERS

1, 1A: Traffic control system
10: Transportation path
11: Travelling route
12: Node
20: Hauling vehicle
21: Vehicle body
22: Wheel
30: Control station
31, 31A: Control server
32, 32A: Stored information update device
34A: Weather information acquisition device
35: Wireless communication device
100, 100A: Vehicle controller
101: Processing device
102: Non-volatile memory (storage device)
Volatile memory (storage device)
110: Sensor device
111: Loading amount sensor
112: Position sensor
113: Orientation sensor
114: Speed sensor
115: Steering angle sensor
116: Brake temperature sensor
120: Travelling drive device
121: Engine
122: Generator
123: Power controller
124L, 124R: Travelling motor
125: Steering device
126: Electric brake device
127: Mechanical brake device
130: Informing device
131: Wireless communication device
151: Mechanical brake actuation detection section
152: Limiting speed generation section
153: Mechanical brake heat amount calculation section
154: Limiting speed calculation section
155: Control target generation section
156: Autonomous travelling control section 157, 157A: Map/vehicle information storage section
Ea: Allowable kinetic energy
Fr: Road surface resistance
g: Gravitational acceleration
G: Thrust
h: Altitude difference
L: Braking distance
La: First distance
Lb: Second distance
M: Vehicle weight
Q: Mechanical brake accumulated heat amount
qa: Heat generation amount per unit time
Qa: Heat generation amount
qb: Heat release amount per unit time
Qb: Heat release amount
qb1: Sunny-weather heat release amount
qb2: Cloudy-weather heat release amount
Qmax: Mechanical brake actuation limit heat amount (predetermined value)
R: Deceleration force
t: Road surface resistance update clock time
T: Accumulated heat amount calculation clock time
tm: Maintenance time
U: Cumulative mechanical brake accumulated heat amount
Umax: Cumulative mechanical brake actuation limit heat amount (predetermined value)
V: Travelling speed (vehicle speed)
Va: Route limiting speed
Vb: Protection limiting speed (stoppable speed)
Vc: Limiting speed
Vt: Target speed
W: Loading amount
ΔN: Change amount of the potential energy
Δt: Width of the elapsed time
θ: Route gradient

The invention claimed is:

1. A hauling vehicle comprising:
a vehicle body;
wheels disposed on the vehicle body;
a position sensor that acquires a position of the vehicle body;
an orientation sensor that acquires an orientation of the vehicle body;
a speed sensor that acquires travelling speed of the vehicle body;
a travelling drive device that includes a mechanical brake device and an electric brake device that give a braking force to the wheels, and drives the wheels;
a storage device that stores map information including a route shape, a route gradient, and a route limiting speed regarding a travelling route of the vehicle body; and
a vehicle controller that is configured to generate a control target including a target speed on a basis of the position of the vehicle body, the orientation of the vehicle body, the travelling speed of the vehicle body, and the map information, and controls the travelling drive device to cause the travelling speed of the vehicle body to become the target speed, wherein
the vehicle controller is configured to
calculate a protection limiting speed of the mechanical brake device, the protection limiting speed increasing along with elapse of a time that starts from detection of actuation of the mechanical brake device and also includes a point of time where the mechanical brake device has become an inactive state after being actuated, on a basis of the travelling speed acquired by the speed sensor and the route gradient included in the map information,
calculate a first distance across which the vehicle body is allowed to travel in a case where the route limiting speed is set as an upper limit value of the target speed after elapse of a maintenance time settled in advance, in a predetermined width of elapsed time that is a width of elapsed time that stars from the detection of the actuation of the mechanical brake device and also includes a point of time where the mechanical brake device has become an inactive state after being actuated,
calculate a second distance across which the vehicle body is allowed to travel in a case where the protection limiting speed is set as the upper limit value of the target speed, in the predetermined width of the elapsed time starting from the detection of the actuation of the mechanical brake device,
employ a lower speed from either of the protection limiting speed and the route limiting speed as the upper limit value of the target speed and cause the vehicle body to travel, when the first distance is shorter than the second distance, and
output a maintenance request instruction while keeping a stopped state of the vehicle body when the first distance is longer than the second distance.

2. The hauling vehicle according to claim 1, wherein
the hauling vehicle includes a loading amount sensor that acquires a loading amount of the hauling vehicle, and
the vehicle controller is configured to calculate the protection limiting speed while taking the loading amount acquired by the loading amount sensor into consideration.

3. The hauling vehicle according to claim 1, wherein
the map information further includes road surface resistance of the travelling route, and
the vehicle controller is configured to calculate the protection limiting speed while taking the road surface resistance into consideration.

4. The hauling vehicle according to claim 3, wherein
the vehicle controller is configured to
calculate the road surface resistance on a basis of the travelling speed acquired by the speed sensor when the actuation of the mechanical brake device has been detected, the position of the vehicle body acquired by the position sensor when the actuation of the mechanical brake device has been detected, the position of the vehicle body acquired by the position sensor when the vehicle body has stopped due to the actuation of the mechanical brake device, and the route gradient, and
update the road surface resistance of the map information by the road surface resistance calculated.

5. The hauling vehicle according to claim 1, wherein
the vehicle controller is configured to
calculate an accumulated heat amount of the mechanical brake device on a basis of the route gradient and the travelling speed acquired by the speed sensor, when detecting the actuation of the mechanical brake device, and
calculate the protection limiting speed on a basis of the accumulated heat amount.

6. The hauling vehicle according to claim 1, wherein
the hauling vehicle includes a brake temperature sensor that acquires temperature of the mechanical brake device, and
the vehicle controller is configured to calculate an accumulated heat amount of the mechanical brake device on a basis of the temperature of the mechanical brake device acquired by the brake temperature sensor, when detecting the actuation of the mechanical brake device, and calculate the protection limiting speed on a basis of the accumulated heat amount.

7. The hauling vehicle according to claim 1, wherein the hauling vehicle includes an informing device that informs of a maintenance request of the hauling vehicle in response to the maintenance request instruction, and the vehicle controller is configured to calculate a cumulative value of an accumulated heat amount of the mechanical brake device in a case detecting the actuation of the mechanical brake device, and output the maintenance request instruction to the informing device in a case the calculated cumulative value of the accumulated heat amount exceeds a predetermined value.

8. The hauling vehicle according to claim 1, wherein the vehicle controller is configured to calculate a deceleration degree in a case where only the electric brake device is used, on a basis of the route gradient included in the map information and the travelling speed acquired by the speed sensor, and decrease the target speed at a position closer to the vehicle body relative to a position at which the route limiting speed decreases, on a basis of the deceleration degree calculated.

9. A traffic control system including the hauling vehicle according to claim 1 and a control server that executes traffic control of the hauling vehicle, wherein the vehicle controller is configured to calculate an accumulated heat amount of the mechanical brake device on a basis of the travelling speed acquired by the speed sensor, in a case detecting the actuation of the mechanical brake device, and transmit, to the control server, the calculated accumulated heat amount of the mechanical brake device and a clock time at which the accumulated heat amount has been calculated, the control server is configured to acquire weather information, decide a heat release amount per unit time on a basis of the weather information acquired, calculate a post-correction accumulated heat amount obtained by correcting the accumulated heat amount, on a basis of elapsed time starting from the clock time at which the accumulated heat amount has been calculated and the heat release amount per unit time, and transmit the post-correction accumulated heat amount to the vehicle controller of the hauling vehicle, and the vehicle controller is configured to calculate the protection limiting speed on a basis of the post-correction accumulated heat amount.

* * * * *